(12) United States Patent
Takemoto et al.

(10) Patent No.: US 6,981,860 B2
(45) Date of Patent: Jan. 3, 2006

(54) APPARATUS FOR MANUFACTURING SYNTHETIC RESIN HOLLOW MEMBER INCORPORATING AN INTERMEDIATE ELEMENT THEREIN

(75) Inventors: Yoshihiro Takemoto, Higashihiroshima (JP); Shoso Nishida, Hiroshima (JP)

(73) Assignees: G.P. Daikyo Corporation, Hiroshima (JP); The Japan Steelworks, Ltd., Tokyo (JP)

( * ) Notice: Subject to any disclaimer, the term of this patent is extended or adjusted under 35 U.S.C. 154(b) by 700 days.

(21) Appl. No.: 09/925,789

(22) Filed: Aug. 10, 2001

(65) Prior Publication Data

US 2002/0027098 A1 Mar. 7, 2002

Related U.S. Application Data

(62) Division of application No. 09/189,150, filed on Nov. 10, 1998, now Pat. No. 6,299,816.

(30) Foreign Application Priority Data

Nov. 14, 1997 (JP) .............................................. 9-313227

(51) Int. Cl.
*B29C 45/14* (2006.01)

(52) U.S. Cl. ..................... 425/116; 425/129.1; 425/576; 425/588; 425/572

(58) Field of Classification Search ................. 425/576, 425/588, 121, 116, 127, 572, 19.1
See application file for complete search history.

(56) References Cited

U.S. PATENT DOCUMENTS

| | | | |
|---|---|---|---|
| 4,113,627 A | 9/1978 | Leason | |
| 5,221,538 A | 6/1993 | Gasami | 425/127 |
| 5,556,541 A | 9/1996 | Ruschke | |
| 5,885,499 A | 3/1999 | Aksberg | |
| 6,042,364 A | 3/2000 | Nishida | 425/574 |

FOREIGN PATENT DOCUMENTS

| | | |
|---|---|---|
| DE | 41 26 041 | 2/1992 |
| DE | 195 04 332 | 8/1996 |
| JP | 4-91914 A | 3/1992 |
| JP | 7-4830 | 1/1995 |
| JP | 7-217755 A | 8/1995 |
| JP | 7-217755 | 8/1995 |
| JP | 8-11155 A | 1/1996 |
| JP | 8-34032 A | 2/1996 |
| JP | 9-248842 A | 9/1997 |

*Primary Examiner*—Edmund H. Lee
(74) *Attorney, Agent, or Firm*—Foley & Lardner LLP

(57) ABSTRACT

Method and apparatus for manufacturing a synthetic resin-made hollow member incorporating an intermediate element are provided which enable operations of molding half bodies, abutting and joining the half bodies together, and molding an intermediate element in a series of steps, and which eliminate the necessity of such a manual work as may otherwise be required in incorporating the intermediate element into the half bodies. A pair of rotary injection molding dies are used which can be opened and closed relative to each other and are rotatable relative to each other over an angle of 60° for each turn, each die having a half body molding section including one male molding portion and two female molding portions in the direction of rotation for each rotational run over an angle of 120°, each die also having an intermediate element molding portion provided between specified half body molding portions in the direction of each rotational run over an angle of 120°. In each two rotational runs of the molding dies, a series of steps is carried out including first injection for molding a pair of half bodies and an intermediate element, molded product setting for matching two half bodies with the intermediate element set in place and abutting the two half bodies against each other, and second injection for injecting melted resin onto the abutting portions and joining the two half bodies, whereby a hollow member with the intermediate element set between the two half bodies can be obtained.

1 Claim, 19 Drawing Sheets

APPARATUS FOR MANUFACTURING SYNTHETIC RESIN HOLLOW MEMBER INCORPORATING AN INTERMEDIATE ELEMENT THEREIN

This is a Divisional Application of application Ser. No. 09/189,150, filed Nov. 10, 1998, now U.S. Pat. No. 6,299,816.

BACKGROUND OF THE INVENTION

The present invention relates to a method and apparatus for manufacturing a synthetic resin hollow member incorporating an intermediate element therein, for example, a synthetic resin-made strainer having a filter incorporated therein, and to such a synthetic resin hollow member.

Conventionally, when manufacturing such a synthetic resin hollow item incorporating an intermediate element therein, for example, a synthetic resin-made strainer having a filter incorporated therein, one generally known method which would be commonly considered is such that with a pair of synthetic resin-made half bodies previously molded which constitute a pair of shells of the hollow member, a separately manufactured intermediate element is disposed between the two half bodies, the two half bodies being then brought into abutment against each other and bonded together through application of adhesive to the abutment surface or by thermally melting the abutted portions, whereby a finished hollow member incorporating the intermediate element is obtained.

In this connection, it is also known to join the half bodies by filling a melted resin mass into an interior resin passage or outer peripheral resin passage formed along peripheral edge of the abutting portions. It is also known to carry out such melted resin loading into the resin passage by utilizing a molding die in which separate half bodies are molded, when the separate half bodies are joined together in such a way as aforesaid.

By employing such a method, it is possible to more stably ensure high strength of bond between the so joined half bodies and good sealing performance of the butt-joined portion as compared to the prior art practice in which such joining is carried out by adhesion or thermal melting.

Further, in Japanese Patent Application Laid-Open No. 7-217755, for example, there is disclosed a method utilizing the so-called "die slide injection (DSI) method" wherein a die assembly including a pair of dies is used such that one of the dies has a male molding portion and a female molding portion for molding one separate half body and the other die has a female molding portion and a male molding portion provided in opposed relation to the molding portions of the one die, and wherein after separate half bodies are simultaneously molded by using the die assembly (first injection), die opening is carried out once for insertion of a separately made intermediate element into one of the half bodies and one of the dies is caused to slide relative to the other die so that separate half bodies left in respective female molding portions are brought into abutment with each other before die clamping, with melted resin being injected onto peripheral edges of the abutting portions (second injection) to join the two half bodies together.

According to this DSI method, productivity can be considerably enhanced over the conventional method in which molding of separate half bodies and abutting/joining of the half bodies are carried out at separate stages.

An arrangement which can further enhance production efficiency in the manufacturing of synthetic resin hollow members is disclosed in, for example, Japanese Patent Publication No. 7-4830 which teaches a rotary injection molding die construction. It dose not intend to consider of manufacturing synthetic resin hollow members incorporating an intermediate element therein, but, the above mentioned die construction is basically a combination of molding dies adapted to be opened and closed relative to each other such that one of the molding dies is rotatable relative to the other die over a predetermined angular range, each die having a molding section consisting of at least one male molding portion and two female molding portions in a repetitive sequence of male/female/female in the direction of rotation for each rotational run over the predetermined angular range. In this conjunction, there is also disclosed a rotary injection molding method (so-called die rotary injection (DRI) method) wherein by using such a molding die assembly, molding separate half bodies and joining a pair of abutted half bodies are carried out during each cycle of rotational (e.g., forward-reverse) movement so that a finished product can be obtained for each cycle of rotational movement.

While, as stated above, productivity can be increased by utilizing the die slide injection (DSI) over the conventional practice in which the molding of half bodies and the abutting and joining the half bodies are carried out in entirely different stages, it has been still necessary that the intermediate element be manufactured separately from the half bodies and be manually inserted in place at the time of die opening midway during molding operation.

This involves a problem that a stage for manufacturing an intermediate element structure must be provided separately from the stage for abutting and joining the half bodies together, and also, it means that the need for troublesome manual operation cannot be eliminated.

Therefore, it is a primary object of the present invention to provide a method and apparatus for manufacturing a synthetic resin-made hollow member incorporating an intermediate element which enable operations of molding half bodies, abutting and joining the half bodies together, and molding an intermediate element in a series of steps, and which eliminate the necessity of such a manual work as may otherwise be required in incorporating the intermediate element into the half bodies, and an synthetic resin-made hollow member produced by employing the method and apparatus.

SUMMARY OF THE INVENTION

In order to accomplish the above mentioned object, according to a first aspect of the present invention, there is provided a method of manufacturing a synthetic resin hollow member incorporating an intermediate element wherein after the intermediate element is disposed between a pair of synthetic resin-made half bodies, the half bodies are brought into abutment with each other and joined together at their abutting portions, whereby the synthetic resin hollow member incorporating the intermediate element is produced, the method comprising: using a pair of rotary injection molding dies which can be opened and closed relative to each other and are rotatable relative to each other at angular intervals of (360/6n) degrees, each die having a half body molding section consisting of at least one male molding portion and two female molding portions in a repetitive sequence of male/female/female in the direction of rotation for each rotational run over an angle of (360/3n) degrees, each die also having an intermediate element molding portion provided between specified half body molding portions in the direction of rotation for each rotational run over an angle of (360/3n) degrees; and carrying out the following steps:

That is, a first die clamping step for closing and clamping the molding die pair; a first injection step for injecting a melted resin mass into a molding cavity defined by closing the pair of molding dies for molding a first half body and a second half body through a combination of male and female portions and for molding an intermediate element to be set between the half bodies through a combination of intermediate element molding portions; a first die rotating step for opening the pair of dies after the first injection step and causing the dies to rotate for an angle of (360/6n) degrees relative to each other so that the intermediate element is mated to and fitted in the first half body; a second die rotating step for opening the pair of dies again after the first die rotating step and causing the dies to rotate for a further angle of (360/6n) degrees relative to each other so that the first half body in which the intermediate element is set is brought into abutment with the second half body through a combination of female die molding portions; a second die clamping step for closing and clamping the pair of dies again after the second die rotating step; and a second injection step to be carried out after the second clamping step for injecting a melted resin mass onto abutting portions of the half bodies for joining the two half bodies.

By carrying out these steps, in every two rotational runs of the molding dies, a hollow member having the intermediate element incorporated between the first and second half bodies can be obtained.

In the first aspect of the present invention, the method of manufacturing a synthetic resin hollow member incorporating an intermediate element comprises: using a pair of mold dies for rotary injection molding (so-called DRI method) which can be opened and closed relative to each other and are rotatable relative to each other at angular intervals of (360/6n) degrees, each die having a half body molding section consisting of at least one male molding portion and two female molding portions in a repetitive sequence of male/female/female in the direction of rotation for each turn of (360/3n) degrees, each die also having an intermediate element molding portion provided between specified half body molding portions in the direction of rotation for each rotational run over an angle of (360/3n) degrees, and carrying out a first injection step for molding a first half body, a second half body and an intermediate element to be set between the half bodies; a first die rotating step for causing the dies to rotate for an angle of (360/6n) degrees relative to each other so that the intermediate element is mated to and fitted in the first half body after the first injection step; a second die rotating step for causing the dies to rotate for a further angle of (360/6n) degrees relative to each other so that the first half body in which the intermediate element is set is mated to and brought into abutment with the second half body; and thereafter, a second injection step for injecting a melted resin mass onto abutting portions of the half bodies for joining the two half bodies, whereby in each two rotational runs of the dies a hollow member having an intermediate element set between the first and second half bodies can be obtained. Therefore, by employing the DRI method it is possible to carry out the molding and butt-joining of half bodies, and also the molding of an intermediate element in a series of steps. Also it is possible to eliminate such manual work as has been involved in setting the intermediate element in place.

That is, as compared wit, the prior art wherein adhesive bonding or heat melting is carried out for joining separate half bodies, high bond strength of joined half bodies and good sealing characteristics of the butt-joined surface can be more stably secured; and by using the DRI method it is possible to achieve higher production efficiency.

According to a second aspect of the present invention, there is provided an apparatus for manufacturing a synthetic resin hollow member incorporating an intermediate element such that after the intermediate element is disposed between a pair of synthetic resin-made half bodies, the half bodies are brought into abutment with each other and joined together at their abutting portions, whereby the synthetic resin hollow member incorporating the intermediate element is produced, the apparatus comprising: a pair of molding dies assembled together so as to be opened and closed relative to each other, rotary mechanism for rotating at least one of the molding dies at angular intervals of (360/6n) degrees relative to the other molding die, and injection machine for injecting a melted resin mass into a molding cavity defined by the pair of molding dies being closed.

The molding dies each have a half body molding section consisting of at least one male molding portion and two female molding portions provided in a repetitive sequence of male/female/female in the direction of rotation for each rotational run over an angle of (360/3n) degrees, and an intermediate element molding portion provided between specified half body molding portions in the direction of rotational movement for each (360/3n) degrees.

For every two rotational runs of the molding dies, a first injection is carried out such that first and second half bodies are molded by a combination of male and female molding portions, and an intermediate element to be set between the first and second half bodies is molded by a combination of intermediate element molding portions. After the intermediate element is mated to and fitted in the first half body molded at the first injection step, the first half body in which the intermediate element is set is mated to and abutted with a corresponding second half body so that the half bodies are assembled into a molded product, and a second injection is carried out such that melted resin is injected onto the abutting portions of the two half bodies whereby the half bodies are joined together. Thus, in every two rotational runs of the molding dies, a hollow member with the intermediate element set between the first and second half bodies can be obtained.

In the second aspect of the present invention, the apparatus for manufacturing a synthetic resin hollow member comprises a pair of molding dies for rotary injection molding (so-called DRI method) assembled together so as to be opened and closed relative to each other and rotatable over an angle of (360/6n) degrees for each turn relative to each other; the molding dies each having a half body molding section consisting of at least one male molding portion and two female molding portions provided in a repetitive sequence of male/female/female in the direction of rotation for each rotational run over an angle of (360/3n) degrees, and an intermediate element molding portion provided between specified half body molding portions in the direction of rotational movement for each (360/3n) degrees; and wherein for every two rotational runs of the molding dies, a first injection is carried out to mold a first and a second half bodies and an intermediate element to be set between the first and second half bodies, and after the intermediate element is mated to and fitted in the first half body molded at the first injection step, the first half body in which the intermediate element is set is mated to and abutted with a corresponding second half body so that the half bodies are assembled into a molded product, and a second injection is carried out such that melted resin is injected onto the abutting portions of the two half bodies for joining the half bodies together, whereby for every two rotational runs of the molding dies, a hollow member with the intermediate element set between the first and second half bodies can be obtained. Therefore, by employing the DRI method it is possible to carry out the molding and butt-joining of half bodies, and also the molding of an intermediate element in a series of steps. Also it is possible to eliminate such manual work as has been involved in setting the intermediate element in place.

That is, as compared with the prior art wherein adhesive bonding or heat melting is carried out for joining separate half bodies, high bond strength of joined half bodies and good sealing characteristics of the butt-joined surface can be more stably secured; and by using the DRI method it is possible to achieve higher production efficiency.

According to a third aspect of the present invention, there is provided a synthetic resin hollow member adapted to incorporate an intermediate element therein by placing the intermediate element between a pair of synthetic resin-made half bodies, then causing the two half bodies to abut against each other and joining them at their abutting portions, wherein the synthetic resin hollow member is manufactured by using a pair of rotary injection molding dies which can be opened and closed relative to each other and are rotatable relative to each other at angular intervals of (360/6n) degrees, each die having a half body molding section consisting of at least one male molding portion and two female molding portions in a repetitive sequence of male/female/female in the direction of rotation for each rotational run over an angle of (360/3n) degrees, each die also having an intermediate element molding portion provided between specified half body molding portions in the direction of rotation for each rotational run over an angle of (360/3n) degrees.

For every two rotational runs of the molding dies, a first injection is carried out such that first and second half bodies are molded by a combination of male and female molding portions, and an intermediate element to be set between the first and second half bodies is molded by a combination of intermediate element molding portions. After the intermediate element is mated to and fitted in the first half body molded at the first injection step, the first half body in which the intermediate element is set is mated to and abutted with a corresponding second half body so that the half bodies are assembled into a molded product, and a second injection is carried out such that melted resin is injected onto the abutting portions of the two half bodies whereby the half bodies are joined together. Thus, for every two rotational runs of the molding dies, a finished product with the intermediate element set between the first and second half bodies can be obtained.

In the third aspect of the present invention, the synthetic resin hollow member is manufactured by using a pair of molding dies for rotary injection molding (so-called DRI method) which can be opened and closed relative to each other and are rotatable relative to each other over an angle of (360/6n) degrees for each turn, each die having a half body molding section consisting of at least one male molding portion and two female molding portions in a repetitive sequence of male/female/female in the direction of rotation for each rotational run over an angle of (360/3n) degrees, each die also having an intermediate element molding portion provided between specified half body molding portions in the direction of rotation for each rotational run over an angle of (360/3n) degrees; for every two rotational runs of the molding dies, a first injection is carried out to mold a first and a second half bodies, and an intermediate element to be set between the first and second half bodies; after the intermediate element is mated to and fitted in the first half body molded at the first injection step, the first half body in which the intermediate element is set is mated to and abutted with a corresponding second half body so that the half bodies are assembled into a molded product, and a second injection is carried out such that melted resin is injected onto the abutting portions of the two half bodies whereby the half bodies are joined together so that in every two rotational runs of the molding dies, a finished product with the intermediate element set between the first and second half bodies can be obtained. Therefore, by employing the DRI method it is possible to carry out the molding and butt-joining of half bodies, and also the molding of an intermediate element in a series of steps. Also it is possible to eliminate such manual work as has been involved in setting the intermediate element in place.

That is, as compared with the prior art wherein adhesive bonding or heat melting is carried out for joining separate half bodies, high bond strength of joined half bodies and good sealing characteristics of the butt-joined surface can be more stably secured; and by using the DRI method it is possible to achieve higher production efficiency.

DETAILED DESCRIPTION OF THE PREFERRED EMBODIMENTS

One embodiment of the present invention will now be described in detail with reference to the accompanying drawings which illustrate by way of example the embodiment as applied to the manufacturing of a synthetic resin-made oil strainer.

FIGS. 28 through 31 show an oil strainer W as a synthetic resin hollow member embodying the invention. The oil strainer W is a hollow member comprising an upper half body $W_U$ having an outlet tube portion Wo, and a lower half body $W_L$ having an inlet tube portion Wi, and has a filter Wf (see FIG. 31) disposed in a hollow interior thereof for filtering foreign matter present in incoming oil.

The oil strainer W, as will be described in detail hereinafter, is a product manufactured in the form of a hollow member incorporating an intermediate element (filter Wf) by the so-called die rotary injection (DRI) method such that upper and lower half bodies $W_U$, $W_L$, and a filter Wf as the intermediate element to be disposed in the hollow member are each molded by one molding die, the half bodies $W_U$ and $W_L$ being butt-joined in the molding die after the filter Wf having been disposed in a space defined by the half bodies $W_U$, $W_L$ within the molding die.

Figure 31:
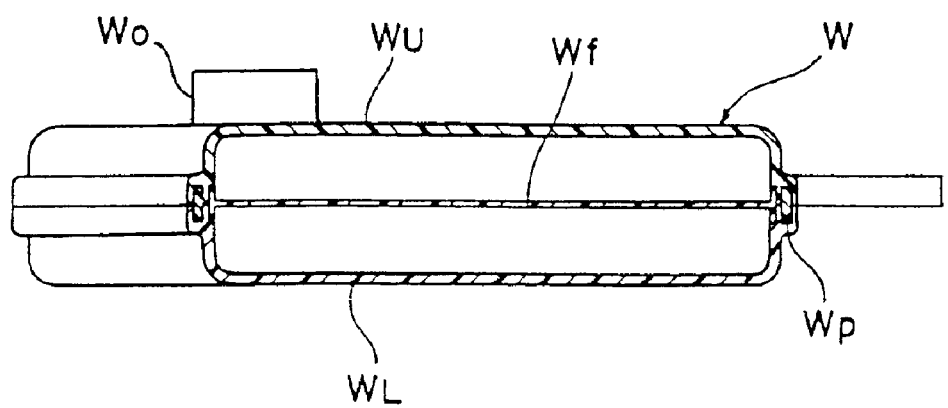
FIG. 31 is an explanatory view of the oil strainer in longitudinal section taken along the Y—Y line in FIG. 29.

As best shown in FIG. 31, there are provided channel-like interior passages Wp of closed section which are formed preferably along the outer peripheries of respective abutting surfaces of the half bodies $W_U$, $W_L$, more preferably defined by wall portions of respective half bodies $W_U$ and $W_L$, such that after the upper and lower half bodies $W_U$ and $W_L$ are brought into abutment with each other, a resin mass (secondary resin) for joining the half bodies together is filled into the interior passage Wp.

In the present embodiment, the interior passage Wp is configured to have a closed sectional configuration defined by wall portions of the half bodies $W_U$, $W_L$. As an alternative, however, it is possible to arrange that while the interior passage is partially open at the time when the half bodies are in abutment with each other, by setting the half bodies in a specified die, the opening is closed by die surfaces so that a closed sectional configuration is formed.

Next, the construction of molding dies for so-called die rotary injection (DRI) employed in manufacturing (molding) the above mentioned oil strainer W will be described.

Figure 1:
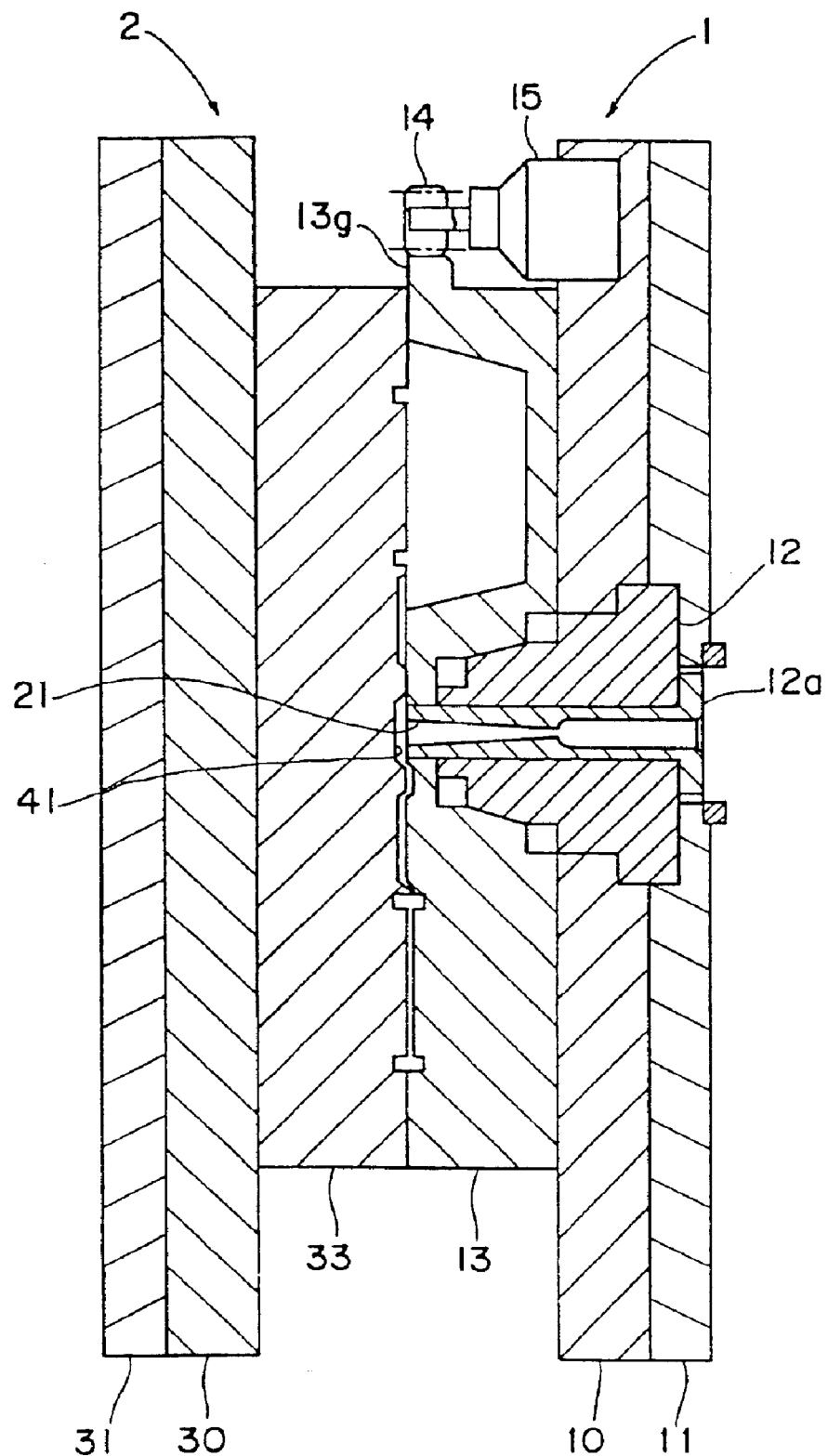
FIG. 1 is an explanatory view in longitudinal section taken along lines A–C in FIG. 7 for illustrating a molding die assembly in clamped condition with respect to an embodiment of the present invention.

FIG. 1 is an explanatory view showing a pair of molding dies (stationary die 1 and movable die 2) as assembled together in molding the oil strainer. As may be understood from the drawing, the molding die assembly comprises a stationary die 1 connected to a molding machine (e.g., injection molding machine, not shown), and a movable die 2 which performs opening and closing operations relative to the stationary die 1. As will be described in detail hereinafter, the stationary die 1 is provided with a pivotal mechanism for pivotally moving predetermined portions including the molding portion of the die.

In FIG. 1, the stationary die 1 and the movable die 2 are shown as being horizontally (right and left) mounted. In actual setting, however, the arrangement of the dies 1, 2 is not limited to such horizontal (right and left) arrangement, but the dies may, for example, be disposed vertically arranged in opposed relation for use.

The stationary die 1 includes a base plate 11 fixed to a body portion 10, a sprue bush 12 fixed centrally to the base plate 11 and body portion 10, and a rotor 13 disposed coaxially with the sprue bush 12. An injection head (not shown) of the molding machine is fixed to the sprue bush 12.

The rotor 13 is basically configured to have a disc shape and, centrally on its surface, a sprue 12a is open which is fitted in a center portion of the sprue bush 12. Molding portions to be described hereinafter are provided on the surface of the rotor 13.

The outer periphery of the rotor 13 is formed with a toothed portion 13g which goes in mesh engagement with a drive gear 14 disposed at an adjacent location thereof. The drive gear 14 is connected to a drive power source 15, for example, a hydraulic motor, such that as the drive gear 14 is rotated by the drive power source 15, according to the direction of the rotation and the number of turns, the rotor 13 rotates for a predetermined angle (360/6n) degrees each time in a predetermined direction.

That is, the toothed portion 13g of the rotor 13, the drive gear 14, and the drive power source 15 constitute rotary mechanism for rotating the rotor 13 a predetermined angle (360/6n) degrees which correspond to "rotary mechanism" set forth in one of the claims of the present invention.

In the present embodiment, n is preferably set at 1 (n=1) so that the rotor 13 is rotated for 60 degrees each time.

Whilst, the movable die 2 includes a body portion 30, a base plate 31 disposed in parallel to the body portion 30, and a die plate 33 fixed to the body portion 30. The die plate 33 includes a molding section to be described hereinafter.

The body portion 30 and base plate 31 are connected, for example, to a hydraulic drive means (not shown) so that opening and closing operation can be performed relative to the stationary die 1 at predetermined time intervals. Not specifically shown, though, on the movable plate 2 side, there is provided an ejector mechanism for ejecting a finished product W when the die assembly is opened for taking out the finished product W.

Figure 2:
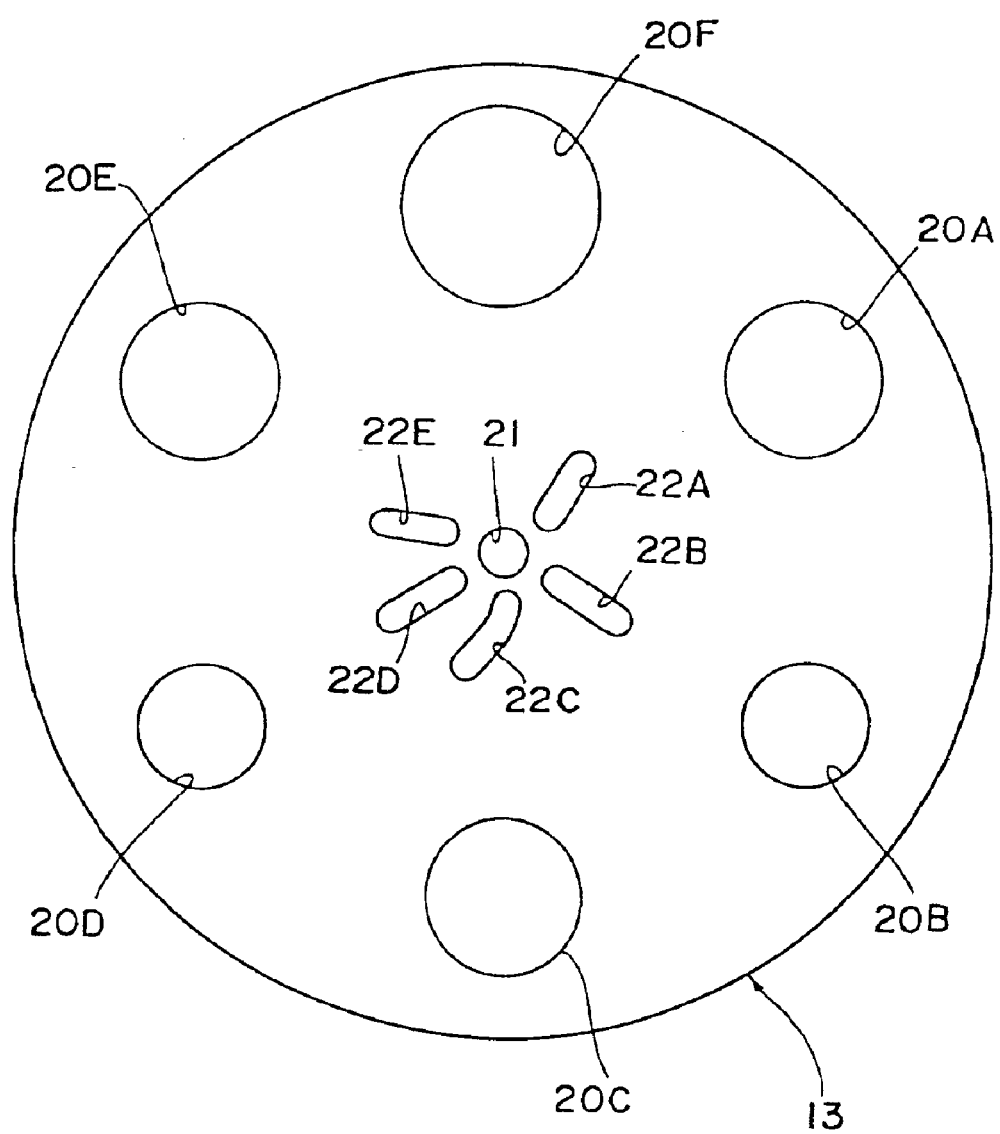
FIG. 2 is an explanatory view in front elevation of a rotor in a stationary die of the molding die assembly.

FIG. 2 is an explanatory view in front elevation showing a die matching surface of the rotor 13 of the stationary die 1. As shown, on the die matching surface of the rotor 13 there are provided five molding portions 20A–20E and one dummy hole 20F which are arranged about the center of the die matching surface of the rotor 13 in circumferentially equally spaced relation (that is, at such angular positions as are sequentially spaced apart by 60 degrees each). The five molding portions 20A–20E and one dummy hole 20F are all circular in shape when viewed in front elevation, and their centers are positioned on a circumference (a pitch circle) of a predetermined radius.

Of the five molding portions 20A–20E, three molding portions 20A, 20C and 20E are intended for molding half bodies $W_U$, $W_L$ and are at an angular position spaced 120 degrees (360/3n degrees) apart sequentially from each other. The molding portions 20A and 20E are both concavely shaped to serve as female molding portions for use in molding one half body (for example, upper half body $W_U$). The molding portion 20C is a convexly shaped to serve as a male molding portion for use in molding the other half body (lower half body $W_L$).

In other words, on the die matching surface of the rotor 13 there is provided a half body molding section consisting of one male molding portion 20C and two female molding portions 20A, 20E in a repetitive sequence of male/female/female at angular intervals of 120 degrees (360/3n degrees) in the direction of rotation.

The molding portion 20B provided between the half body molding portion 20A and the half body molding portion 20C, and the molding portion 20D provided between the half body molding portion 20C and the half body molding portion 20E are both intended for molding a filter Wf as an intermediate element. These molding portions are also at an angular position spaced apart 120 degrees (360/3n degrees) sequentially from each other.

In other words, on the die matching surface of the rotor 13 there are provided intermediate element molding portions 20B, 20D between half body molding portions 20A and 20C and between 20C and 20E respectively at angular intervals of 120 degrees (360/3n degrees) in the direction of rotation.

Between the half body molding portion 20E and the half body molding portion 20A there is provided a dummy hole 20F which is diametrically larger by a predetermined quantity than individual half body molding portions 20A, 20C, and 20E.

The dummy hole 20F, as will be described hereinafter, is such that during one cycle of molding operation the dummy hole is put in combination with a molding portion provided on the opposite side (die plate 33 of the movable die 2) so as to function as a means for adjustment of operation in the direction of rotation.

The die matching surface of rotor 13 of the stationary die 1 is not provided with any resin passage connected to individual molding portions 20A–20E, but as will be described hereinafter, there are provided a group of (five in all) elongated channel-like changeover slots 22A–22E for switching over connections between resin passages associated with molding portions of the movable die 2 and a sprue opening 21 of the sprue bush 12.

The changeover slots 22A–22E are respectively so formed as to be generally oriented toward corresponding molding portions 20A–20E.

On the outer periphery of the rotor 13, as earlier stated, a toothed portion 13g which is in mesh engagement with the drive gear 14 is provided over an arcuate length corresponding to an angle of at least 120 degrees so that as the drive gear 14 rotates (that is, according to the direction of rotation and number of turns made) the rotor 13 rotates at least two times for 60 degrees each time in a predetermined direction. The control of rotational movement of the drive gear 14 (that is, control of rotation of the rotor 13) is carried out by controlling the drive source 15, such as hydraulic motor.

In the present embodiment, the rotor 13 is of such arrangement that it is rotated forward twice in succession at predetermined times for an angle of 60 degrees each and is then rotated reverse twice in succession for an angle of 60 degrees each.

Figure 3:
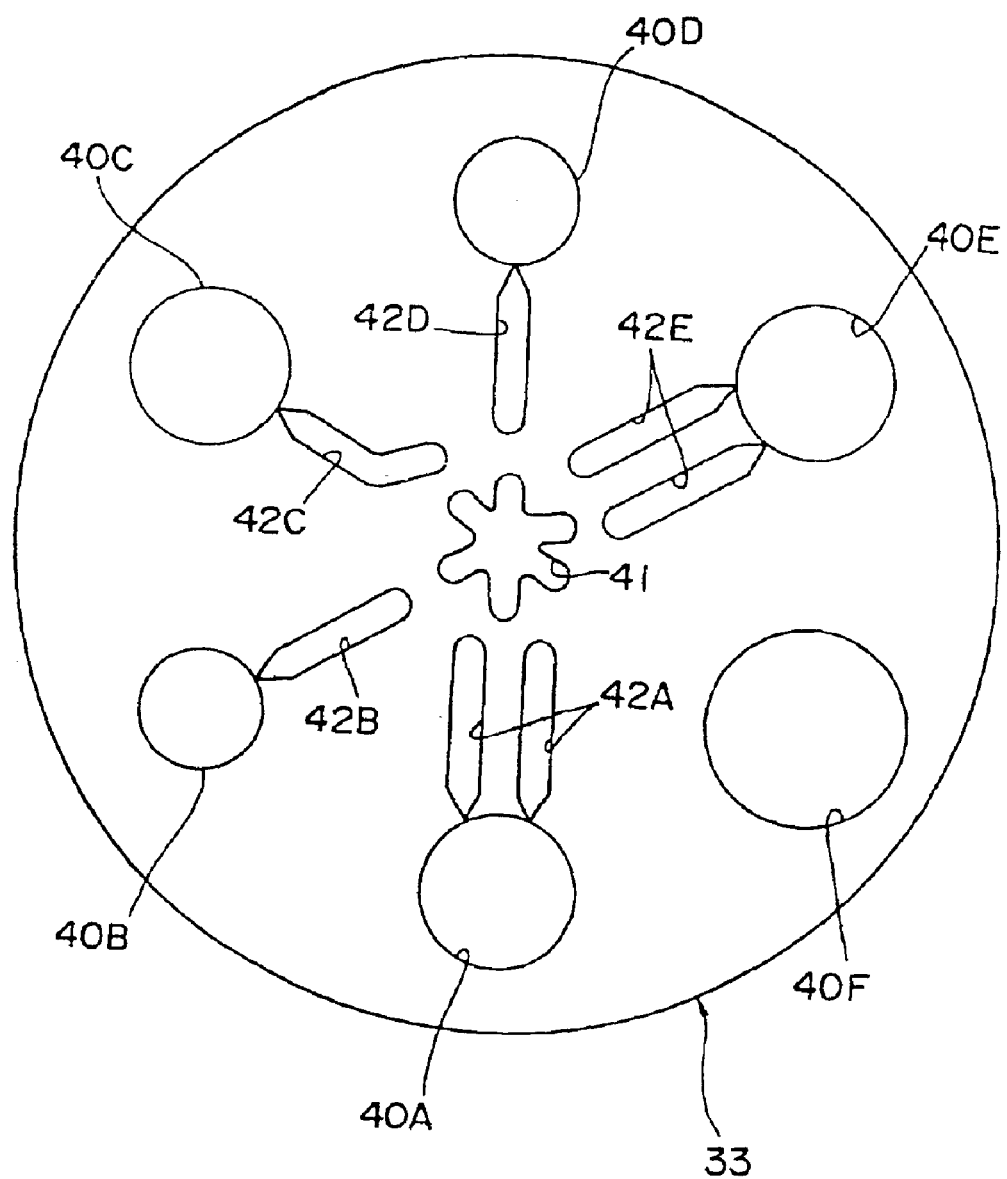
FIG. 3 is an explanatory view in front elevation of a die plate of a movable die of the molding die assembly.

Whilst, FIG. 3 is an explanatory view in front elevation showing a die matching surface of the die plate 33 of the movable die 2. As shown, on the die matching surface of the die plate 33 there are provided five molding portions 40A–40E and one dummy hole 40F which are arranged about the center of the die matching surface of the die plate 33 in circumferentially equally spaced relation (that is, at such angular positions as are sequentially spaced apart by 60 degrees each). The five molding portions 40A–40E and one dummy hole 40F are all circular in shape when viewed in front elevation, and their centers are positioned on a circumference (a pitch circle) of a predetermined radius.

Of the five molding portions 40A–40E, three molding portions 40A, 40C and 40E are intended for molding half bodies $W_U$, $W_L$ and are at an angular position spaced 120 degrees (360/3n degrees) apart sequentially from each other. The molding portions 40A and 40E are both concavely shaped to serve as female molding portions for use in molding one half body (for example, lower half body $W_L$). The molding portion 40C is a convexly shaped to serve as a male molding portion for use in molding the other half body (lower half body $W_U$).

In other words, as is the case with the rotor 13 side, on the die matching surface of the die plate 33 there is provided a half body molding section consisting of one male molding portion 40C and two female molding portions 40A, 40E in a repetitive sequence of male/female/female at angular intervals of 120 degrees (360/3n degrees) in the direction of rotation.

The molding portion 40B provided between the half body molding portion 40A and the half body molding portion 40C, and the molding portion 40D provided between the half body molding portion 40C and the half body molding portion 40E are both intended for molding a filter Wf as an intermediate element These molding portions are also at an angular position spaced apart 120 degrees (360/3n degrees) sequentially from each other.

In other words, on the die matching surface of the die plate 33 of the movable die 2, same as the rotor 13 side, there are provided intermediate element molding portions 40B, 40D between half body molding portions 40A and 40C and between 40C and 40E at angular intervals of 120 degrees (360/3n degrees) in the direction of rotation.

Between the half body molding portion 40E and the half body molding portion 40A there is provided a dummy hole 40F which is diametrically larger by a predetermined quantity than individual half body molding portions 40A, 40C, and 40E.

As will be described hereinafter, the dummy hole 40F, which is similar to the dummy hole 20F provided on the rotor 13 side, is such that during one cycle of molding operation it is put in combination with a molding portion provided on the opposite side (die plate 33 of the movable die 2) so as to function as a means for adjustment of operation in the direction of rotation.

The die plate 33 of the movable die 2 is formed with two kinds of resin passages, including a centrally formed tributarily branched resin passage 41, and resin passages 42A–42E connected directly to the molding portions 40A–40E.

Resin passages 42A and 42E, two each, are respectively connected to the female molding portions 40A and 40E, and resin passages 42B, 42C, and 42D, one each, are respectively connected to other molding portions 40B, 40C and 40D. As will be described hereinafter, the resin passages 42A and 42E, two each, connected to the female molding portions 40A and 40E are used in such a way that one of the each two passages (at left side as viewed from the center of the die plate 33) is used for the purpose of molding half bodies $W_U$, $W_L$ and the other (at right side as viewed from the center of the die plate 33) is used when introducing melted resin into an interior passage Wp of the butt-engaged upper and lower half bodies $W_U$, $W_L$ for joining the half bodies together.

When the movable die 2 is closed relative to the stationary die 1, the branched resin passage 41 is branched with its center portion as a proximal point which corresponds to the opening 21 of the sprue 12a of the sprue bush 12. Five branches are provided in corresponding relation to resin passages 42A–42E connected respectively to the molding portions 40A–40E. These branches are positioned so that the distal end of each branch is spaced a certain distance on its extension from one end of a corresponding resin passage.

When the movable die 2 is closed relative to the stationary die 1, specified resin passages 42A–42E are connected to the branched resin passage 41 (that is, sprue opening 21) by changeover slots 22A–22E provided on the rotor 13 of the stationary die 1. This connection is changed over by the rotation of the rotor 13.

The process of molding an oil strainer W to be carried out by using molding dies constructed as described above will be described herein below.

Figure 7:
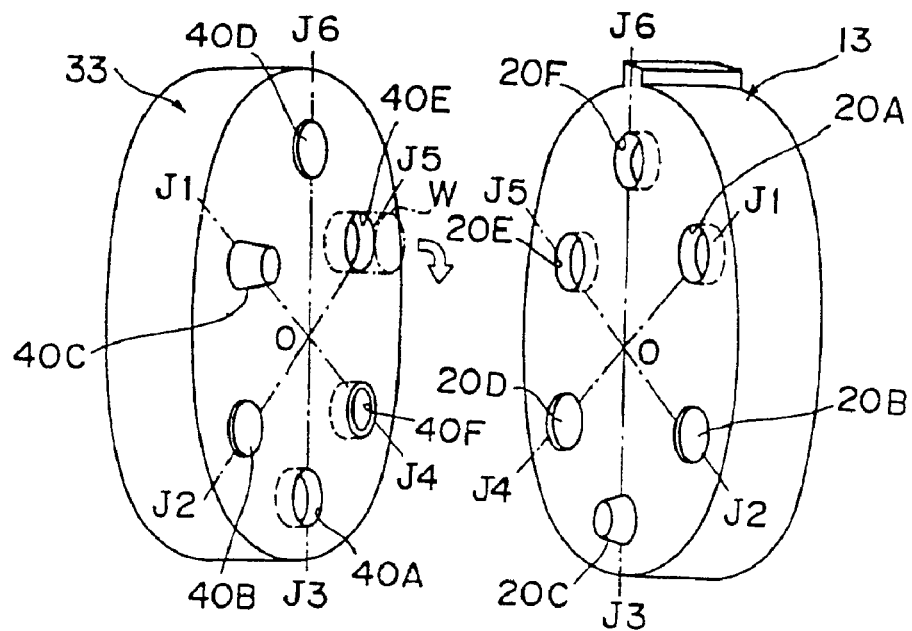
FIG. 7 is a perspective view schematically showing matching of molding portions and dummy holes at initial positions of the rotor of the stationary die and of the die plate of the movable die.

Initially, the stationary die 1 (rotor 13) is put in combination with the movable die 2 (die plate 33) in such a condition as illustrated in FIG. 7. In this case, combinations of molding portions of the two dies 1, 2, and dummy holes of the two dies 1, 2 are as follows:

Movable die 2, half body molding portion 40A (female)/ stationary die 1, half body molding portion 20C (male)

Movable die 2, intermediate element molding portion 40B/ stationary die 1, intermediate element molding portion 20B Movable die 2, half body molding portion 40C (male)/ stationary die 1, half body molding portion 20A (female)

Movable die 2, intermediate element molding portion 40D/ stationary die 1, dummy hole 20F Movable die 2, half body molding portion 40E (female)/ stationary die 1, half body molding portion 20E (female)

Figure 4:
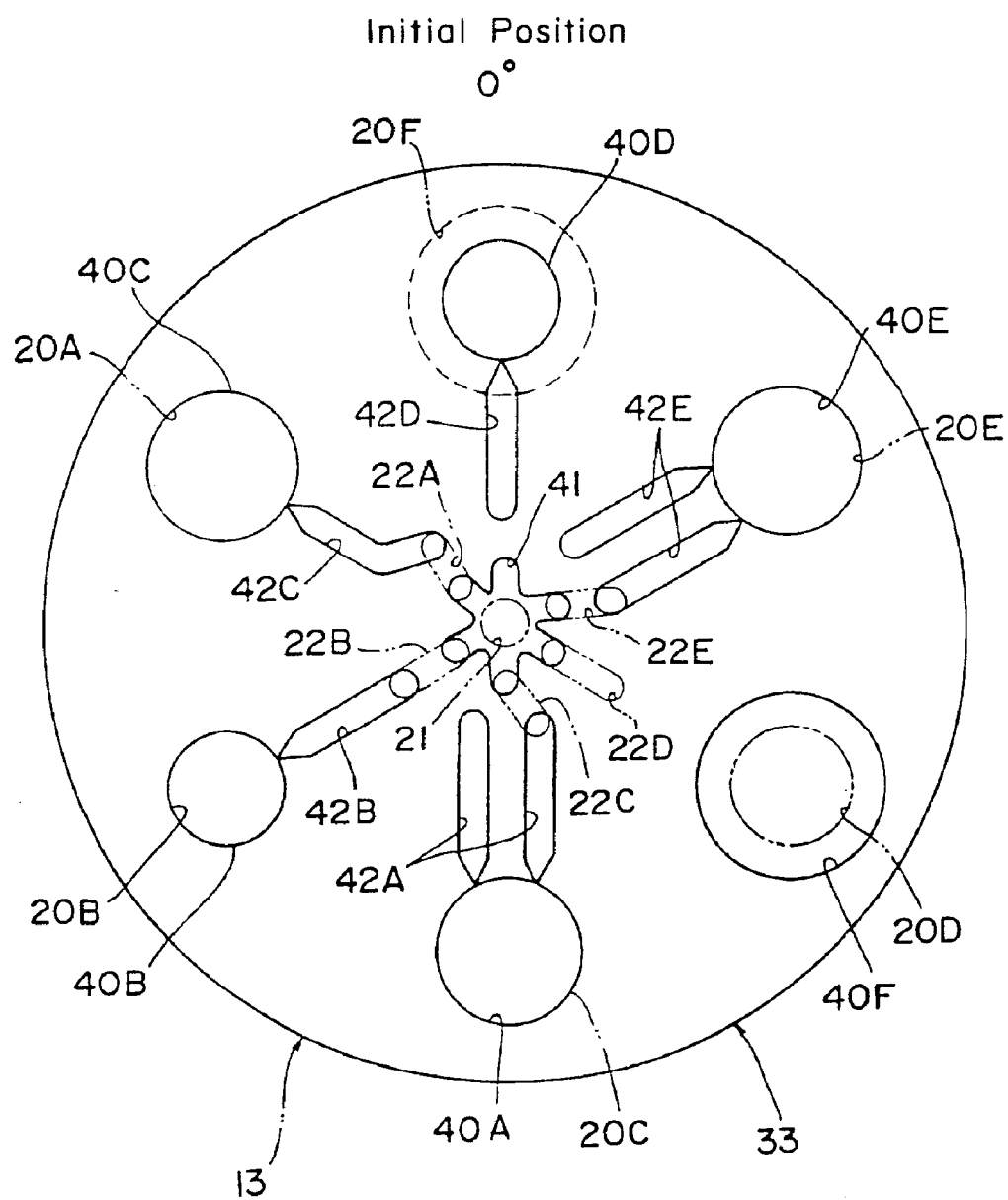
FIG. 4 is an explanatory view in front elevation showing matching of molding portions and dummy holes, and resin passage connections in the rotor of the stationary die and the die plate of the movable die at their initial positions.

Movable die 2, dummy hole 40F/stationary die 1, intermediate element molding portion 20D In this case, changeover slots 22A–22E of rotor 13 of stationary die 1 are respectively at such turn positions as shown by double-dash chain lines in FIG. 4.

That is, changeover slot 22A causes resin passage 42C for half body molding portion 40C of movable die 2 to communicate with branched resin passage 41; changeover slot 22B causes resin passage 42B for intermediate element molding portion 40B of movable die 2 to communicate with branched resin passage 41; changeover slot 22C causes one (half body molding resin passage) of resin passages 42A for molding portion 40A of movable die 2 to communicate with branched resin passage 41; changeover slot 22E causes the other (resin passage for filling melted resin into the interior passage Wp of molded product W) of the resin passages 42E for half body molding portion 40E of movable die 2 with branched resin passage 41.

In this case, changeover slot 22D is oriented toward the dummy hole 40F which has no resin passage, and no changeover slot is connected to resin passage 42D for the intermediate element molding portion 40D of movable die 2 which is mated to the dummy hole 20F of stationary die 1. That is, for any combination with which dummy hole 20F or 40F is associated, no communication with branched resin passage 41 could be obtained.

Therefore, in this condition, the movable die 2 is brought into abutment against the stationary die 1, and die clamping (first die clamping) is carried out, whereby molding portions of stationary die 1 and movable die 2 are correspondingly mated to define the following cavities.

Figure 12:
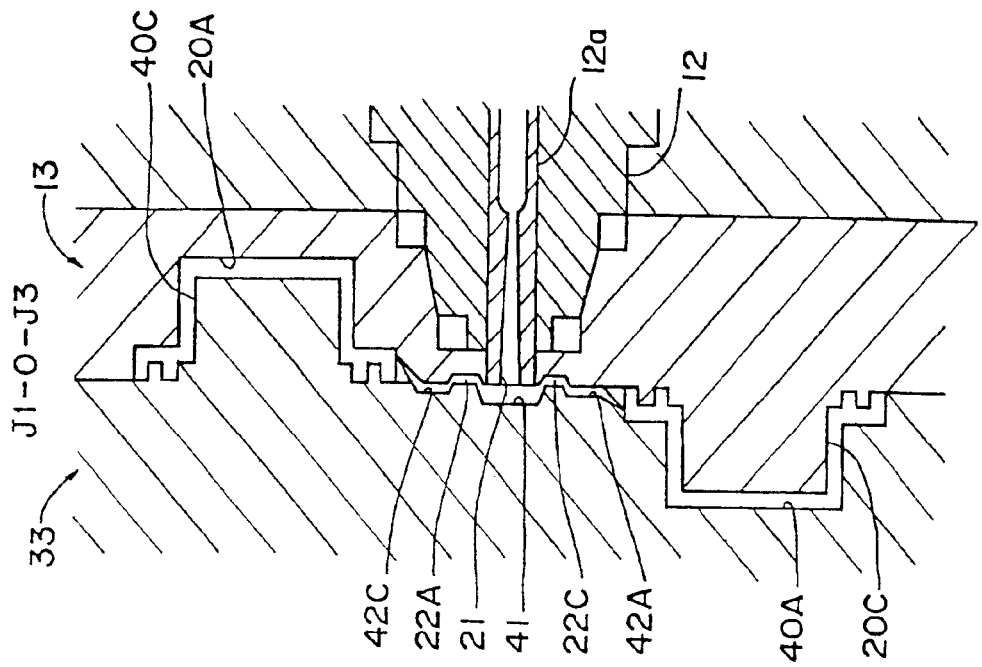
FIG. 12 is an explanatory view in section taken along the line J1-O-J3 in FIG. 7 which shows matched portions of the rotor and die plate.

That is, in a portion extending along the line J1-O-J3 in FIG. 7, as FIG. 12 shows, half body molding portion 40A (female) of movable die 2 (die plate 33) is mated with half body molding portion 20C (male) of stationary die 1 (rotor 13) to define a molding cavity corresponding to the lower half body $W_L$, and half body molding portion 40C (male) of movable die 2 (die plate 33) is mated to half body molding portion 20A (female) of stationary die 1 (rotor 13) to define a molding cavity corresponding to the upper half body $W_U$.

Figure 13:
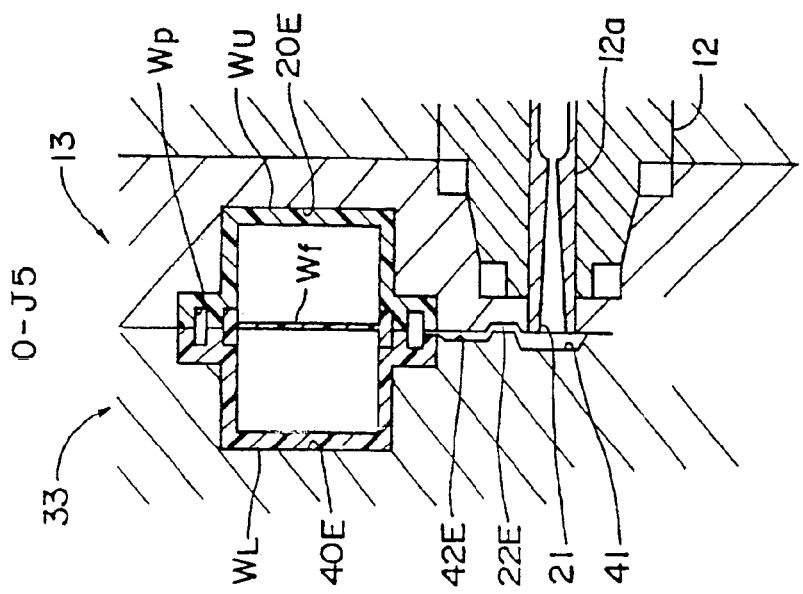
FIG. 13 is an explanatory view in section taken along the line O-J5 in FIG. 7 which shows matched portions of the rotor and die plate.

In a portion extending along the line O-J5 in FIG. 7, as FIG. 13 shows, half body molding portion 40E (female) of movable die 2 (die plate 33) is mated with half body molding portion 20E (female) of stationary die 1 (rotor 13), and the lower half body $W_L$ and filter Wf held in half body molding portion 40E at the die plate 33 side are mated to the upper half body $W_U$ held in the half body molding portion 20E at the rotor 13 side.

A finished product W can be obtained by injection filling a melted resin mass into interior passage Wp with respect to the so matched combination. It is to be noted in this conjunction that the half bodies $W_U$, $W_L$ and filter Wf are all products molded in the previous cycle.

Figure 14:
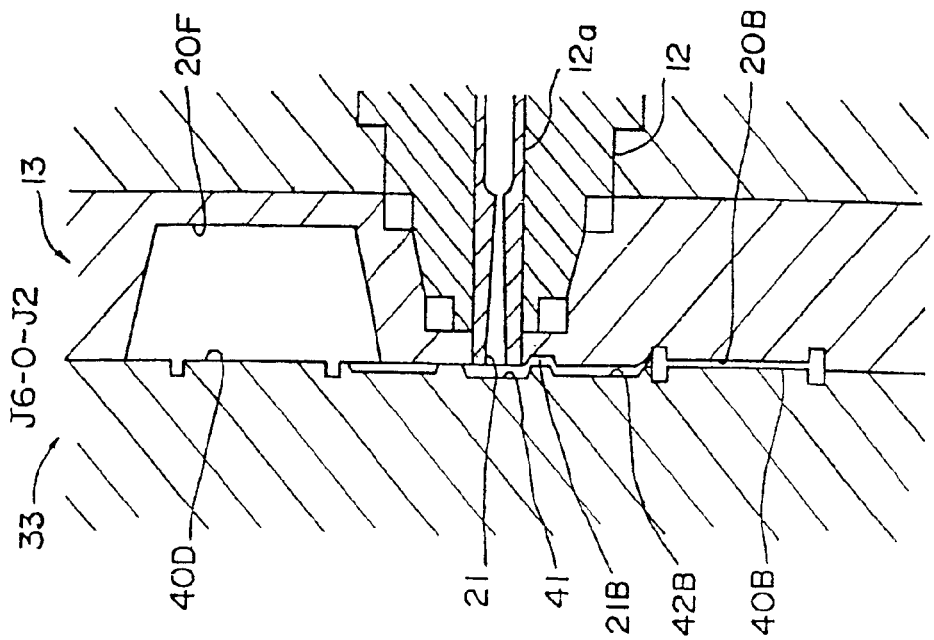
FIG. 14 is an explanatory view in section taken along the line J6-O-J2 in FIG. 7 which shows matched portions of the rotor and die plate.

Further, in a portion extending along the line J6-O-J2 in FIG. 7, as FIG. 14 shows, intermediate element molding portion 40B of movable die 2 (die plate 33) is mated with intermediate element molding portion 20B of stationary die 1 (rotor 13) to define a molding cavity corresponding to the intermediate element (filter Wf). It is noted that the combination of the intermediate element molding portion 40D at the die plate 33 side and the dummy hole 20F at the rotor 13 side does not constitute a molding cavity, because the related resin passage is not connected to the sprue opening 21.

Figure 15:
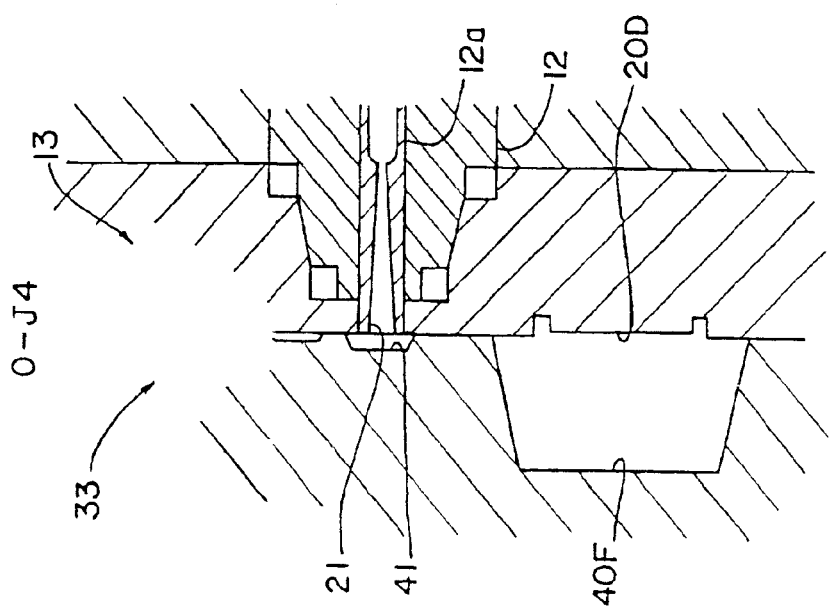
FIG. 15 is an explanatory view in section taken along the line O-J4 in FIG. 7 which shows matched portions of the rotor and die plate.

In a portion extending along the line O-J4 in FIG. 7, as FIG. 15 shows, dummy hole 40F at the die plate 33 side is mated to intermediate element molding portion 20D at the rotor 13 side, but for the same reason no molding cavity could be formed.

When melted resin is injected (first injection) from a molding machine (not shown) in the above described clamped die condition (first die clamping), the melted resin is supplied through the opening 21 of the sprue 12a into the resin passages 42A, 42B, 42C, 42E which are in communication with the branched resin passage 41. It is noted that for the material resin in the present embodiment a nylon resin mixed with a glass-reinforced fiber material, for example, was used.

As a result, in molding cavities formed by combinations of molding portions of the stationary die 1 and movable die 2 the following molded products are produced.

Half body molding portion 40A (female)/half body molding portion 20C (male): lower half body $W_L$ Intermediate element molding portion 40B/intermediate element molding portion 20B: filter Wf Half body molding portion 40C (male)/half body molding portion 20A (female): upper half body $W_U$ Half body molding portion 40E (female)/half body molding portion 20E (female): finished product W It is to be noted in this connection that in the case of first resin injection being made during rise time, molded half bodies (upper half body $W_U$ and lower half body $W_L$) and filter Wf are not present in the molding cavity defined by the half body molding portion 40E (female)/half body molding portion 20E (female); therefore, melted resin injection is carried out after a dummy having same outer shape as one formed by abutting upper half body $W_U$ and lower half body $W_L$ with each other is set in the cavity.

Figure 8:
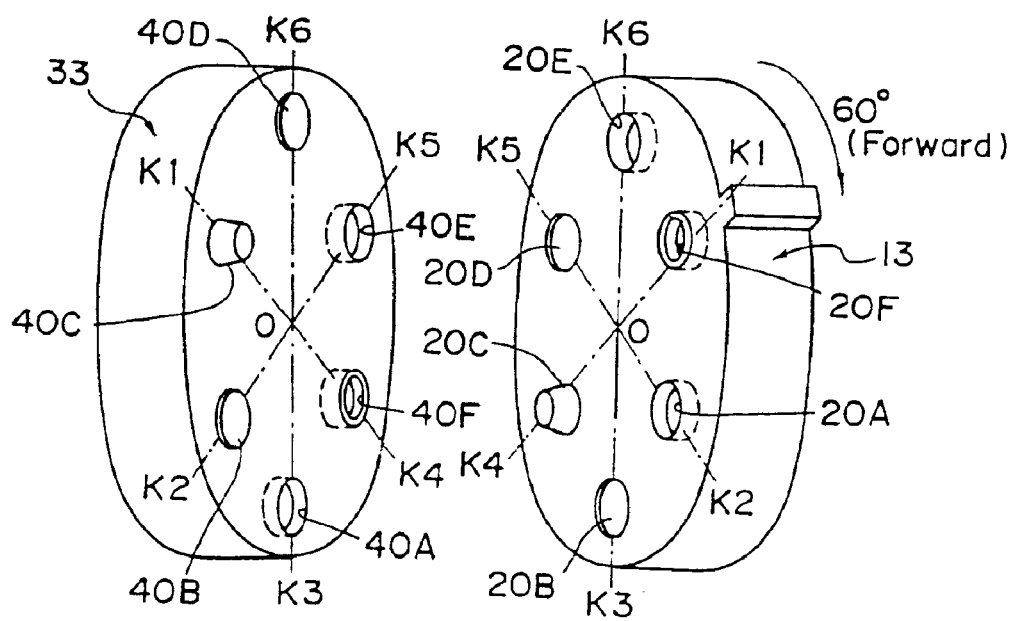
FIG. 8 is a perspective view schematically showing matching of molding portions and dummy holes at a 60° forward turn position of the rotor and die plate.

Next, the movable die 2 is retreated from the stationary die 1 for die opening. A finished product W obtained through the combination of half body molding portion 40E (female) at the die plate 33 side and the half body molding portion 20E (female) at the rotor 13 side is taken out. Thereafter, as FIG. 8 shows, rotor 13 is rotated forward for 60 degrees (first die rotation). As a result of this first die rotation, the following combinations are made with respect to molding portions and dummy holes of stationary die 1 and movable die 2.

Movable die 2, half body molding portion 40A (female)/ stationary die 1, intermediate element molding portion 20B Movable die 2, intermediate element molding portion 40B/ stationary die 1, half body molding portion 20A (female)

Movable die 2, half body molding portion 40C (male)/ stationary die 1, dummy hole 20F Movable die 2, intermediate element molding portion 40D/ stationary die 1, half body molding portion 20E (female)

Movable die 2, half body molding portion 40E (female)/ stationary die 1, intermediate element molding portion 20D Movable die 2, dummy hole 40F/stationary die 2, half body molding portion 20C (male)

Figure 5:
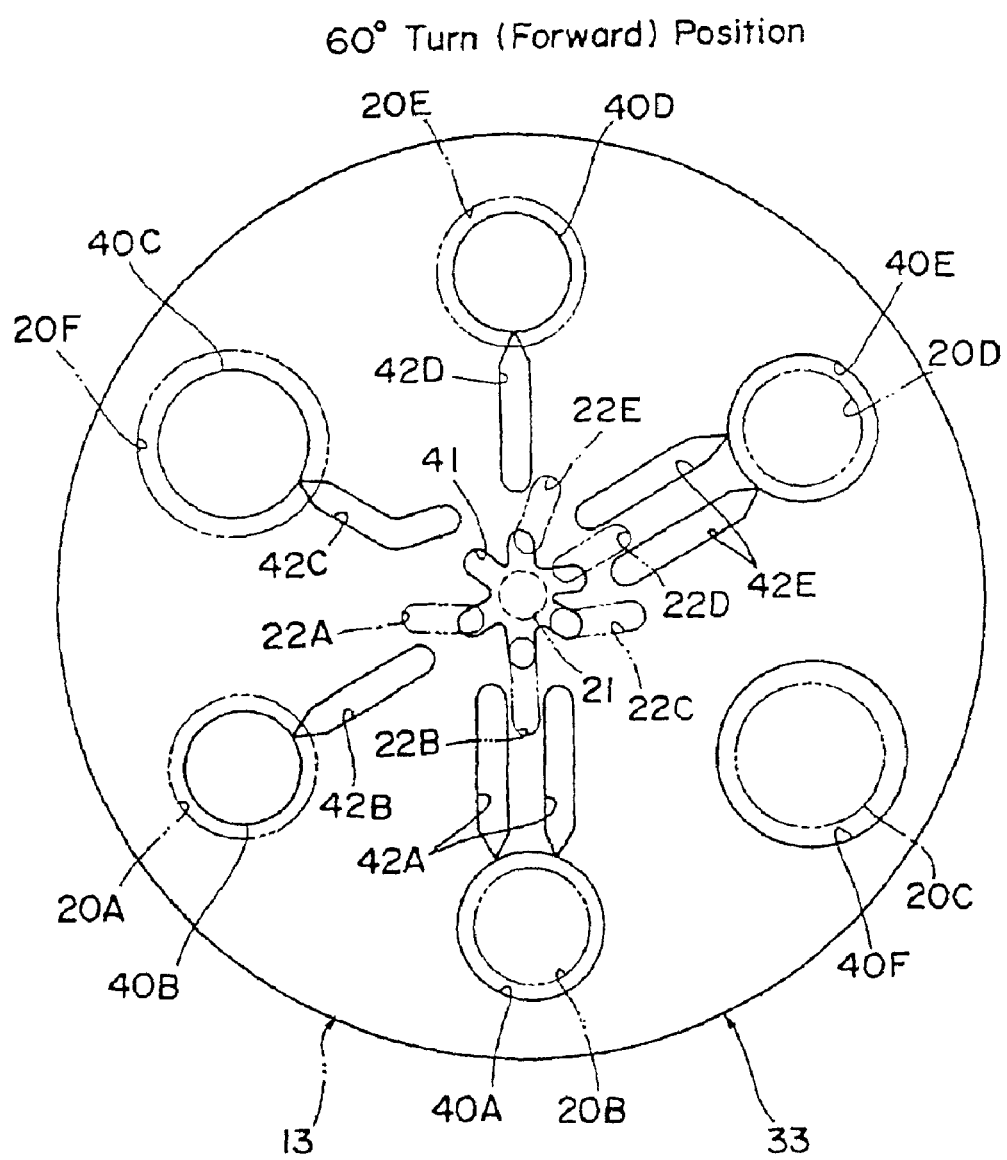
FIG. 5 is an explanatory view in front elevation showing matching of molding portions and dummy holes, and resin passages in switched-over condition in the rotor and the die plate at 60° turn position.

In this case, changeover slots 22A–22E of the rotor 13 of the stationary die 1 are respectively at such turn positions as shown by double dash chain lines in FIG. 5, and none of the changeover slots 22A–22E are connected to resin passages 42A–42E of the die plate 33 of the movable die 2. The resin passages 42A–42E are not in communication with the branched resin passage 41.

In this condition, the movable die 2 is brought into abutment against the stationary die 1, and die clamping is carried out, whereby molding portions of stationary die 1 and movable die 2 are brought into engagement as follows.

Figure 16:
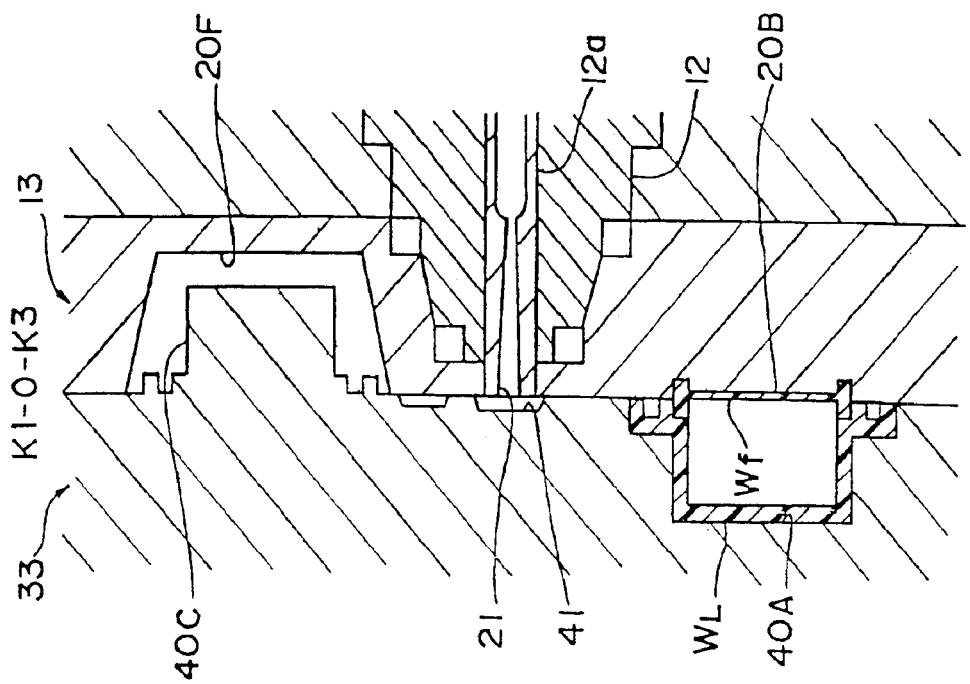
FIG. 16 is an explanatory view in section taken along the line K1-O-K3 in FIG. 8 which shows matched portions of the rotor and die plate.

That is, in a portion extending along the line K1-O-K3 in FIG. 8, as FIG. 16 shows, half body molding portion 40A (female) of movable die 2 (die plate 33) is mated with intermediate element molding portion 20B of stationary die 1 (rotor 13) so that a filter Wf molded at the first injection step and held in intermediate element molding portion 20B is brought into engagement with a lower half body $W_L$ molded at the first injection step and held in the half body molding portion 40A.

Half body molding portion 40C (male) of the movable die 2 is mated with dummy hole 20F of the stationary die 1 (rotor 13). In this combination, no product (part) molded by first injection is held on either side.

Figure 17:
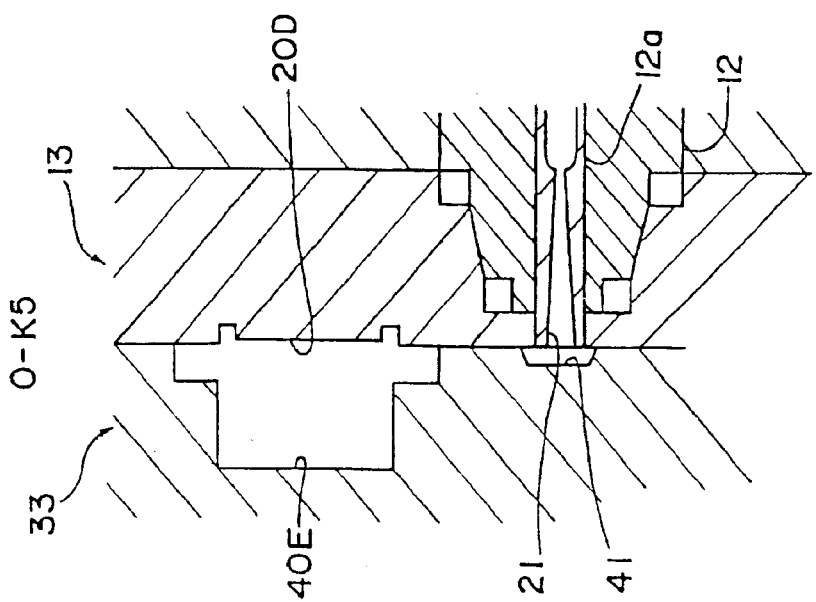
FIG. 17 is an explanatory view in section taken along the line O-K5 in FIG. 8 which shows matched portions of the rotor and die plate.

At a portion extending along line O-K5 in FIG. 8, as FIG. 17 shows, half body molding portion 40E (female) of the movable die 2 (die plate 33) is mated with intermediate element molding portion 20D of the stationary die 1 (rotor 13), but no part molded by first injection is held on either side.

Figure 18:
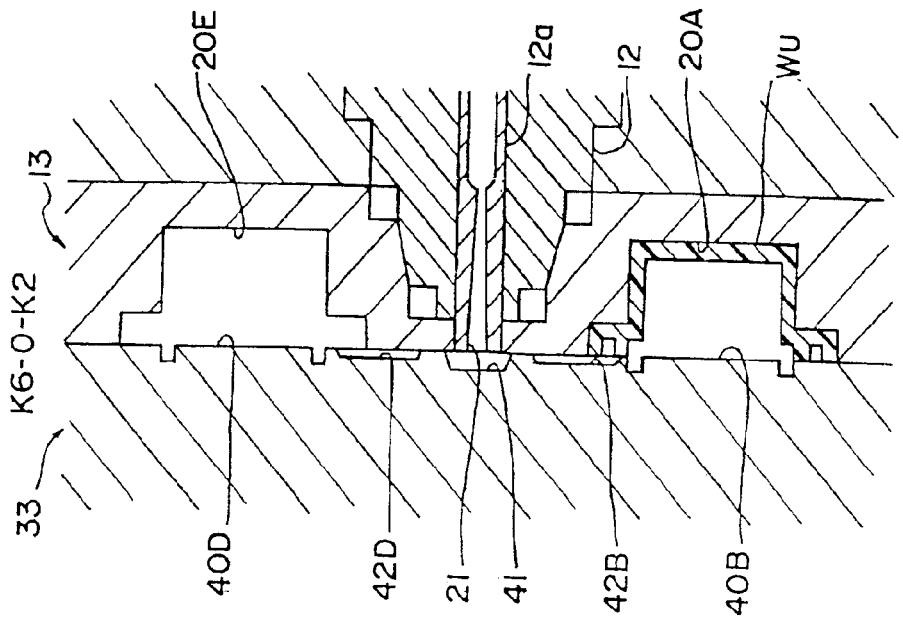
FIG. 18 is an explanatory view in section taken along the line K6-O-K2 in FIG. 8 which shows matched portions of the rotor and die plate.

At a portion extending along line K6-O-K2 in FIG. 8, as FIG. 18 shows, the intermediate element molding portion 40B of the movable die 2 (die plate 33) is mated with half body molding portion 20A of the stationary die 1 (rotor 13). An upper half body $W_U$ molded at the first injection step is held in the half body molding portion 20A. Intermediate element molding portion 40D of the movable die 2 (die plate 33) is mated with half body molding portion 20E of the stationary die 1 (rotor 13), but no product molded by first injection is held on either side.

Figure 19:
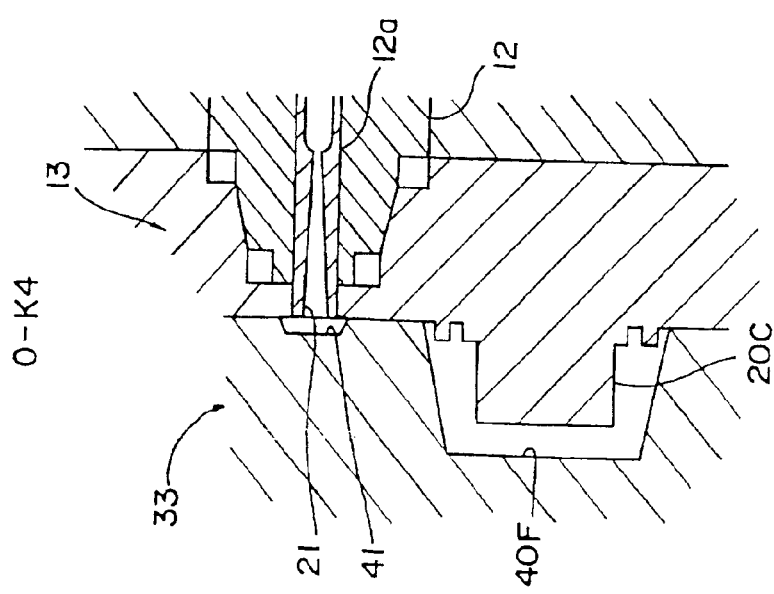
FIG. 19 is an explanatory view in section taken along the line O-K4 in FIG. 8 which shows matched portions of the rotor and die plate.

At a portion extending along line O-K4 in FIG. 8, as FIG. 19 shows, dummy hole 40F on the die plate 33 side is mated with half body molding portion 20C on the rotor 13 side, but no product molded by first injection is held on either side.

Figure 9:
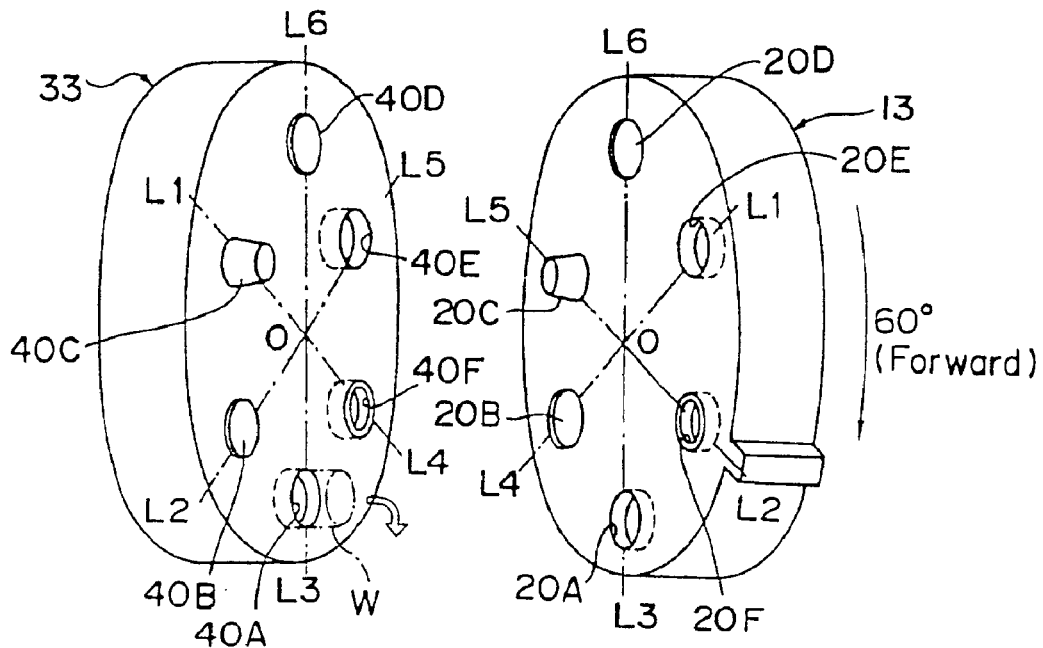
FIG. 9 is a perspective view schematically showing matching of molding portions and dummy holes at a 120° forward turn position of the rotor and die plate.

Thereafter, movable die 2 is retreated again relative to stationary die 1 for die opening and, as FIG. 9 shows, the rotor 13 is rotated further 60 degrees forward (i.e., 120 degrees from initial position: second rotation). As a result of this second rotation, combinations of molding portions and dummy holes of stationary die 1 and movable die 2 are as follows.

Movable die 2, half body molding portion 40A (female)/ stationary die 1, half body molding portion 20A (female)

Movable die 2, intermediate element molding portion 40B/ stationary die 1, dummy hole 20F Movable die 2, half body molding portion 40C (male)/ stationary die 1, half body molding portion 20E (female)

Movable die 2, intermediate element molding portion 40D/ stationary die 1, intermediate element molding portion 20D Movable die 2, half body molding portion 40E (female)/ stationary die 1, half body molding portion 20C (male)

Figure 6:
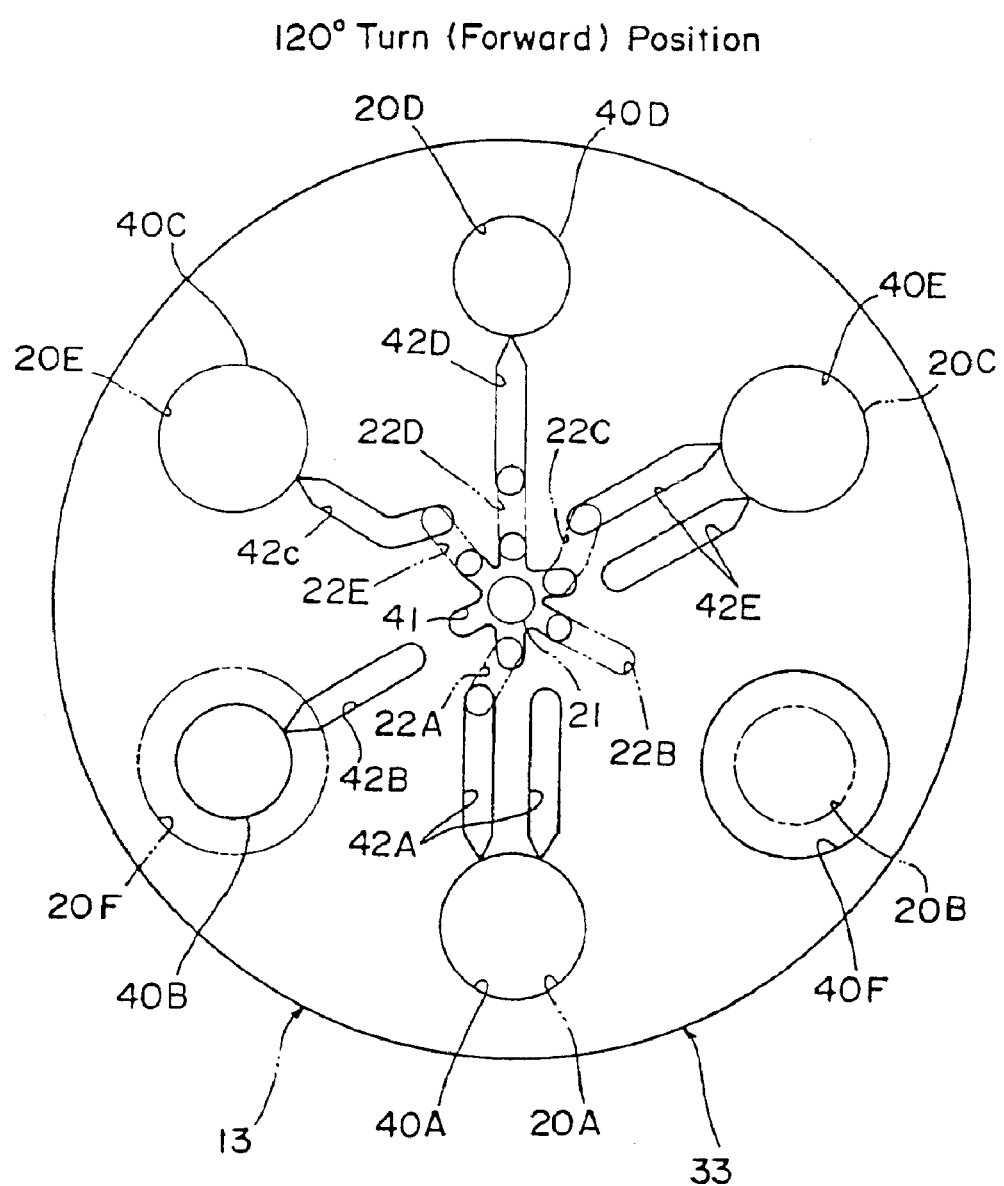
FIG. 6 is an explanatory view in front elevation showing matching of molding portions and dummy holes, and resin passages in switched-over condition at 120° turn position of the rotor and the die plate.

Movable die 2, dummy hole 40F/stationary die 1, intermediate element molding portion 20B In this case, changeover slots 22A–22E of rotor 13 of stationary die 1 are respectively at such turn positions as shown by double-dash chain lines in FIG. 6.

That is, changeover slot 22A causes the other of the resin passages 42A (resin passage for melted resin filling into interior passage Wp for molded product W) for half body molding portion 40A of movable die 2 to communicate with branched resin passage 41; changeover slot 22C causes one of the resin passages 42E (resin passage for half body molding) for half body molding portion 40E of movable die 2 to communicate with branched resin passage 41; changeover slot 22D causes intermediate element molding resin passage 42D for intermediate element molding portion 40O of movable die 2 to communicate with branched resin passage 41; and changeover slot 22E causes resin passage 42C for half body molding portion 40C of movable die 2 to communicate with branched resin passage 41.

In this case, changeover slot 22B is oriented toward the dummy hole 40F which has no resin passage, and no changeover slot is connected to resin passage 42B for the intermediate element molding portion 40B of movable die 2 which is mated with the dummy hole 20F of stationary die 1. That is, for any combination with which dummy hole 20F or 40F is associated, no communication with branched resin passage 41 could be obtained.

Therefore, in this condition, the movable die 2 is brought into abutment against the stationary die 1, and die clamping (first die clamping) is carried out, whereby molding portions of stationary die 1 and movable die 2 are correspondingly mated to define the following cavities.

Figure 20:
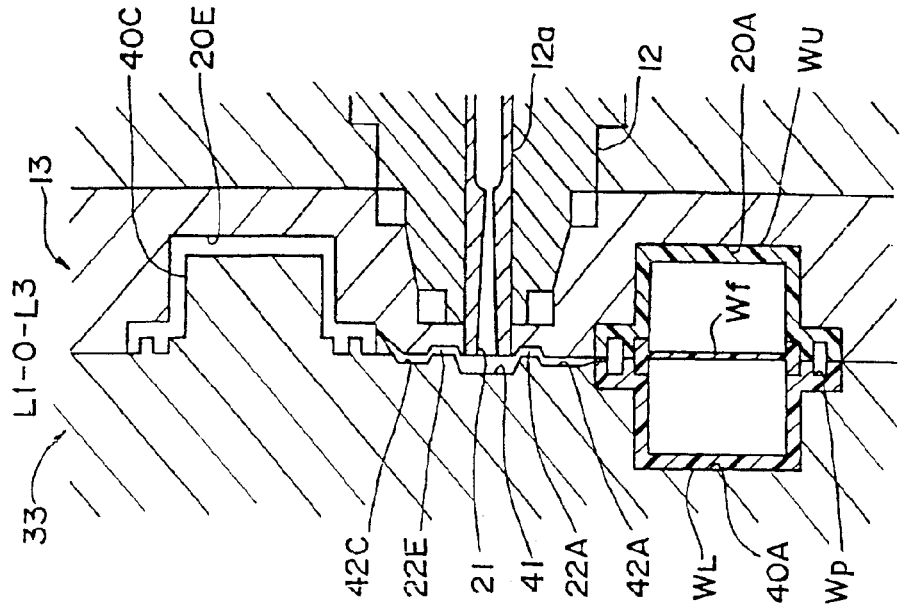
FIG. 20 is an explanatory view in section taken along the line L1-O-L3 in FIG. 9 which shows matched portions of the rotor and die plate.

That is, in a portion extending along the line L1-O-L3 in FIG. 9, as FIG. 20 shows, half body molding portion 40A (female) of movable die 2 (die plate 33) is mated with half body molding portion 20A (female) of stationary die 1 (rotor 13), and lower half body $W_L$ and filter Wf held in half body molding portion 40A (male) of die plate 33 is mated to upper half body $W_U$ held in half body molding portion 20A of rotor 13. A melted resin mass is supplied by injection into the interior passage Wp toward the mated portions to obtain a finished product W.

Half body molding portion 40C (male) of the movable die 2 (die plate 33) is mated with half body molding portion 20E (female) of the stationary die 1 (rotor 13), whereby a molding cavity corresponding to upper half body $W_U$ is obtained.

Figure 21:
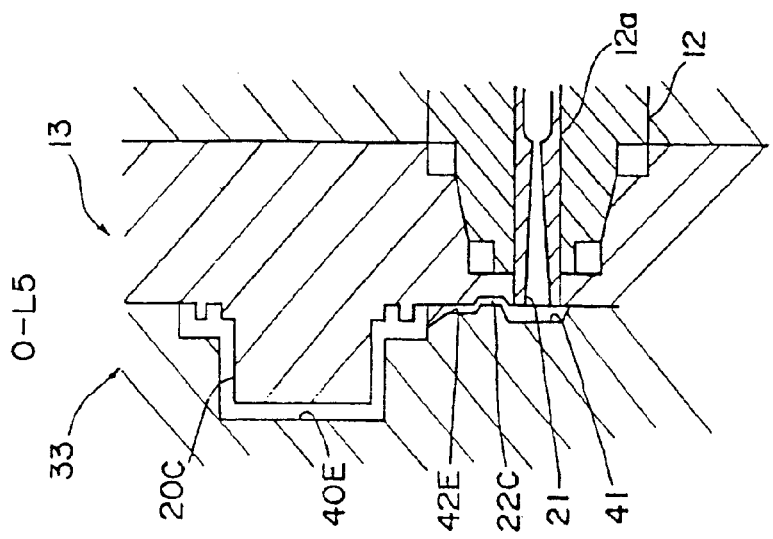
FIG. 21 is an explanatory view in section taken along the line O-L5 in FIG. 9 which shows matched portions of the rotor and die plate.

In a portion extending along line O-L5 in FIG. 9, as FIG. 21 shows, half body molding portion 40E (female) of the movable die 2 (die plate 33) is mated with half body molding portion 20C (male) of the stationary die 1 (rotor 13), whereby a molding cavity corresponding to lower half body $W_L$ is obtained.

Figure 22:
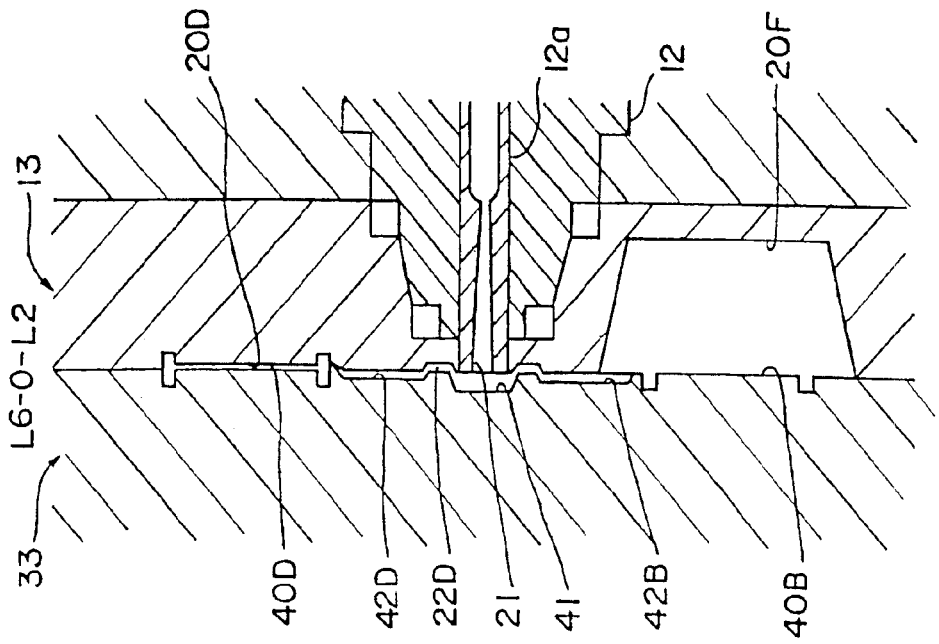
FIG. 22 is an explanatory view in section taken along the line L6-O-L2 in FIG. 9 which shows matched portions of the rotor and die plate.

In a portion extending along line L6-O-L2 in FIG. 9, as FIG. 22 shows, intermediate element molding portion 40D of the movable die 2 (die plate 33) is mated with intermediate element molding portion 20D of the stationary die 1 (rotor 13) to define a molding cavity corresponding to an intermediate element (filter Wf). The combination of the intermediate element molding portion 40B of the die plate 33 side and the dummy hole 20F on the rotor 13 side is not in communication with the sprue opening 21. Therefore, this combination does not form any molding cavity.

Figure 23:
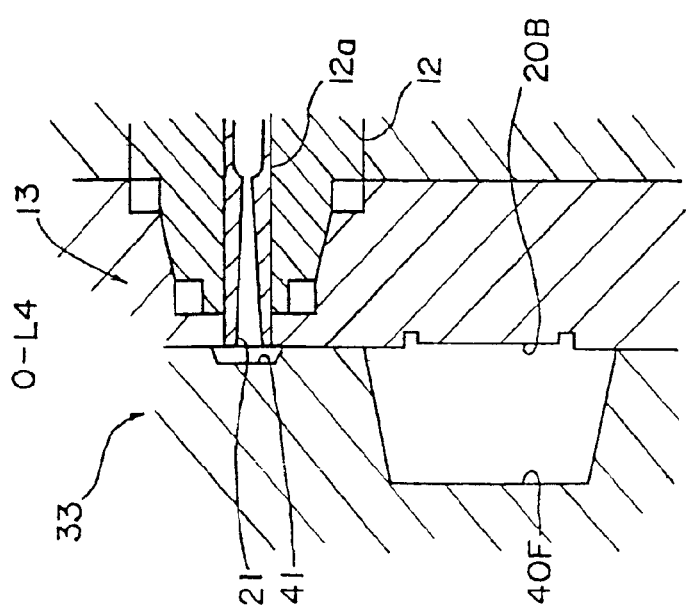
FIG. 23 is an explanatory view in section taken along the line O-L4 in FIG. 9 which shows matched portions of the rotor and die plate.

In a portion extending along line O-L4 in FIG. 9, as FIG. 23 shows, dummy hole 40F on the die plate 33 side is mated with intermediate element molding portion 20B of the rotor 13. However, this combination does not form any molding cavity either.

In the above described die clamped condition (second die clamping), when melted resin is injected (second injection) from a molding machine (not shown), the melted resin is supplied through the opening 21 of the sprue 12*a* into resin passages 42A, 42C, 42D, 42E which are in communication with the branched resin passage 41.

As a result, in molding cavities defined by combinations of respective molding portions of the stationary die 1 and movable die 2, molded products are obtained as follows.

Half body molding portion 40A (female)/half body molding portion 20A (female): finished product W Intermediate element molding portion 40D/intermediate element molding portion 20D: filter Wf Half body molding portion 40C (male)/half body molding portion 20E (female): upper half body $W_U$ Half body molding portion 40E (female)/half body molding portion 20C (male): lower half body $W_L$ Then, die opening is made by retreating the movable die 2 relative to the stationary die 1, and the finished product W obtained by the combination of half body molding portion 40A (female) on the die plate 33 side and half body molding portion 20A (female) on the rotor 13 side is taken out. In this way, one finished product W is obtained on the second turn from the initial position.

Figure 10:
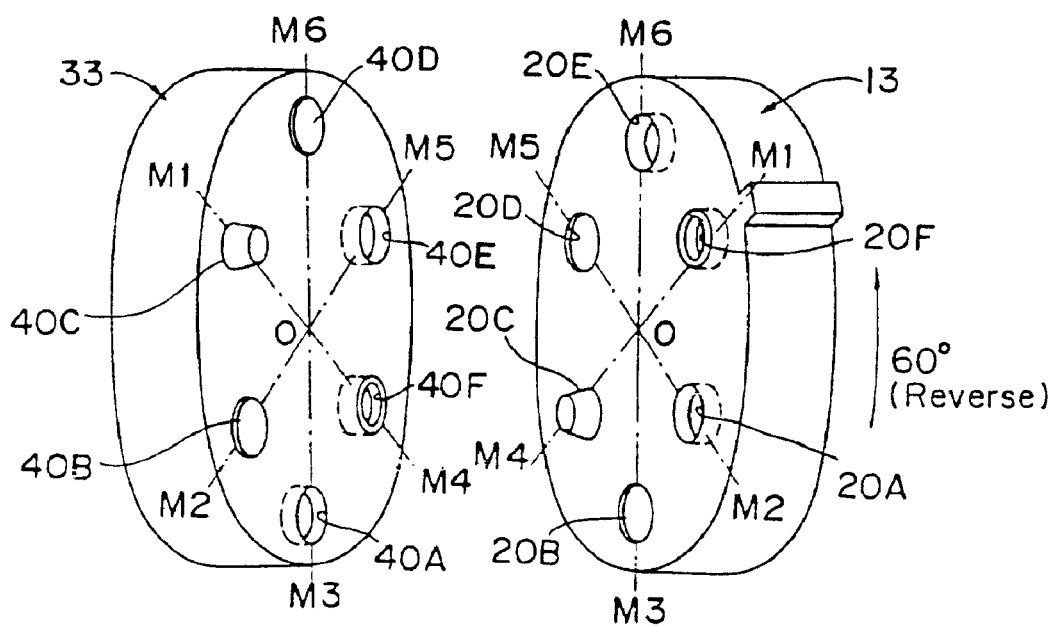
FIG. 10 is a perspective view schematically showing matching of molding portions and dummy holes at a 60° reverse turn position of the rotor and die plate.

Thereafter, as FIG. 10 shows, rotor 13 is reversed 60 degrees to return the rotor 13 to the first turn position (see FIG. 8). As a result of this reversal, combinations of respective molding portions and dummy holes of stationary die 1 and movable die 1 are same as those at the first turn position shown in FIG. 8, that is, as shown below.

Movable die 2, half body molding portion 40A (female)/stationary die 1, intermediate element molding portion 20B

Movable die 2, intermediate element molding portion 40B/stationary die 1, half body molding portion 20A (female)

Movable die 2, half body molding portion 40C (male)/stationary die 1, dummy hole 20F

Movable die 2, intermediate element molding portion 40D/stationary die 1, half body molding portion 20E (female)

Movable die 2, half body molding portion 40E (female)/stationary die 1, intermediate element molding portion 20D

Movable die 2, dummy hole 40F/stationary die 1, half body molding portion 20C (male)

In this case, turn positions of changeover slots 22A–22E at the rotor 13 of the stationary die 1 are same as those shown by double dash chain lines in FIG. 5, and none of the slots 22A–22E are connected to resin passages 42A–42E. Therefore, these slots 42A-to 42E are not in communication with the branched resin passage 41.

In this condition, the movable die 2 is brought into closure with the stationary die 1, whereby molding portions of the stationary die 1 are engaged with those of the movable die 2 in the following combinations.

Figure 24:
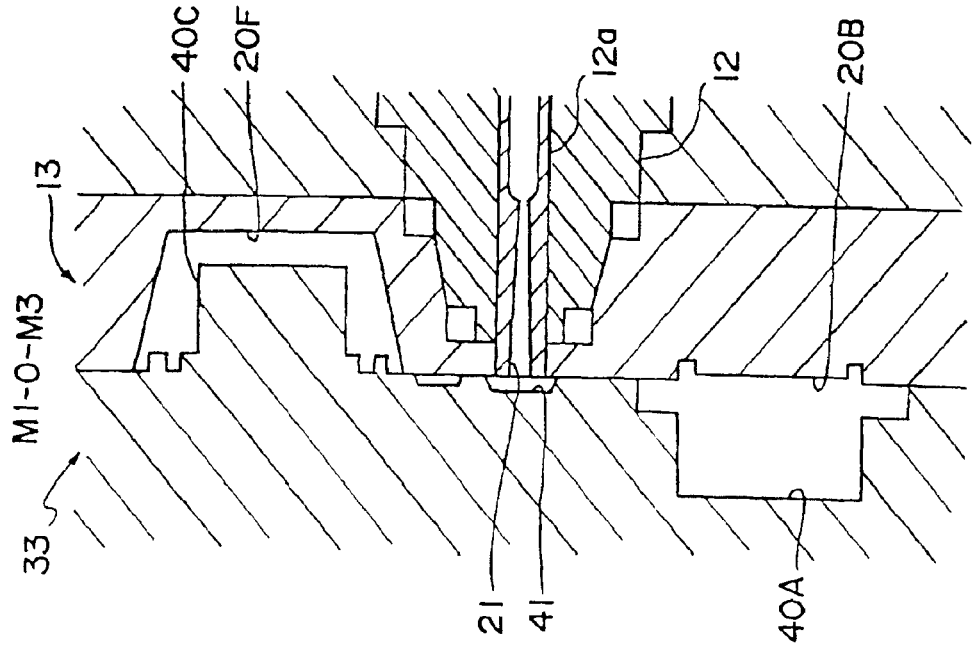
FIG. 24 is an explanatory view in section taken along the line M1-O-M3 in FIG. 10 which shows matched portions of the rotor and die plate.

That is, in a portion extending along line M1-O-M3 in FIG. 10, as FIG. 24 shows, half body molding portion 40A (female) of movable die 2 (die plate 33) is mated with intermediate element molding portion 20B of stationary die 1 (rotor 13), and half body molding portion 40C (male) of movable die 2 (die plate 33) is mated with dummy hole 20F of stationary die 1 (rotor 13). Neither of these combinations hold a molded product resulting from second injection.

Figure 25:
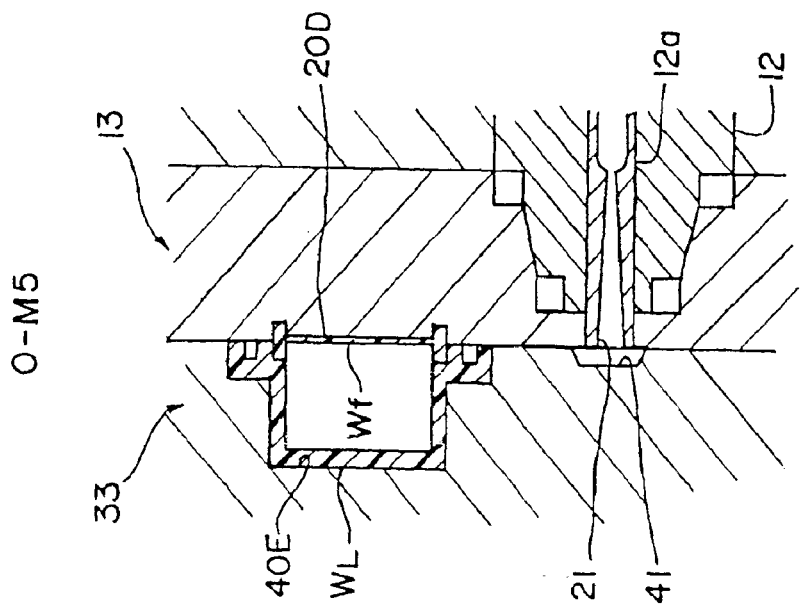
FIG. 25 is an explanatory view in section taken along the line O-M5 in FIG. 10 which shows matched portions of the rotor and die plate.

In a portion extending along line O-M5 in FIG. 10, as FIG. 25 shows, a filter Wf held in the intermediate element molding portion 20D, i.e., a product molded at second injection step, is fitted to a lower half body $W_L$, a product molded at second injection step and held in the half body molding portion 40E.

Figure 26:
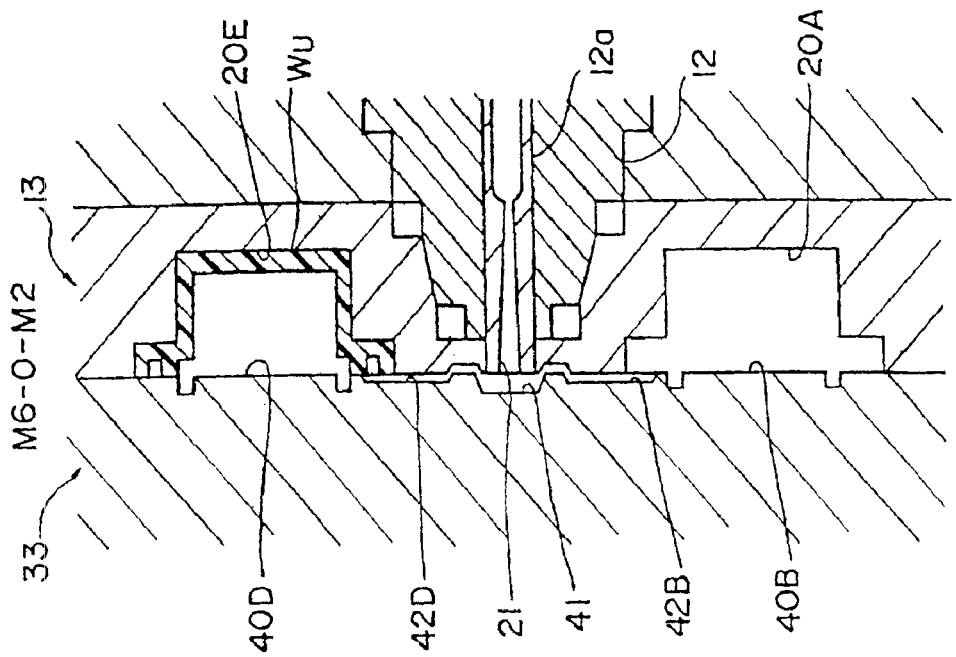
FIG. 26 is an explanatory view in section taken along the line M6-O-M2 in FIG. 10 which shows matched portions of the rotor and die plate.

In a portion extending along line M6-O-M2 in FIG. 10, as FIG. 26 shows, intermediate element molding portion 40D of movable die 2 (die plate 33) is mated with half body molding portion 20E of stationary die 1 (rotor 13). In the half body molding portion 20E is held an upper half body $W_U$ molded at second injection step. Intermediate element molding portion 40B of movable die 2 (die plate 33) is mated with half body molding portion 20A of stationary die 1 (rotor 13), but in this case no molded product from first injection step is held on either side.

Figure 27:
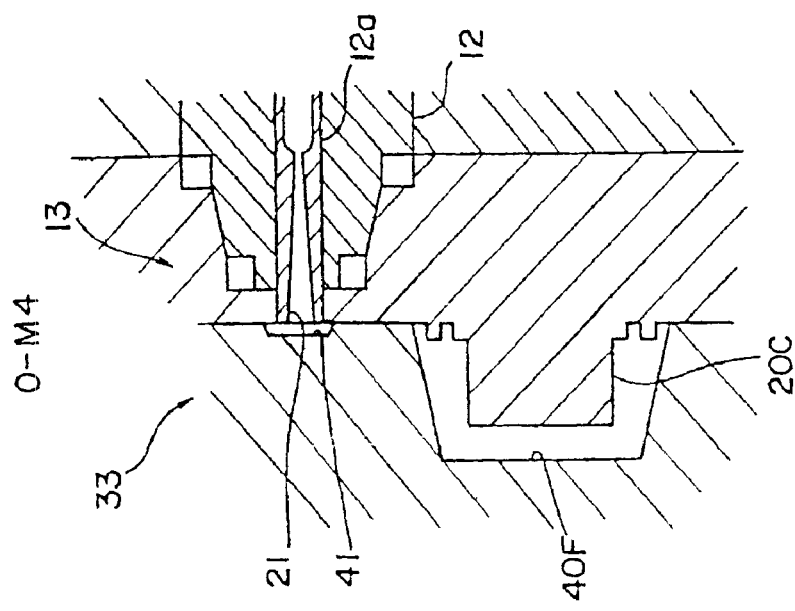
FIG. 27 is an explanatory view in section taken along the line O-M4 in FIG. 10 which shows matched portions of the rotor and die plate.
Figure 28:
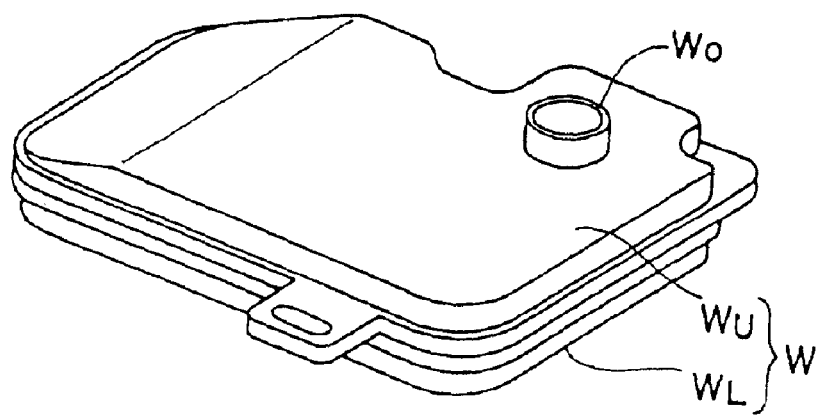
FIG. 28 is a perspective view of an oil strainer embodying the present invention.
Figure 29:
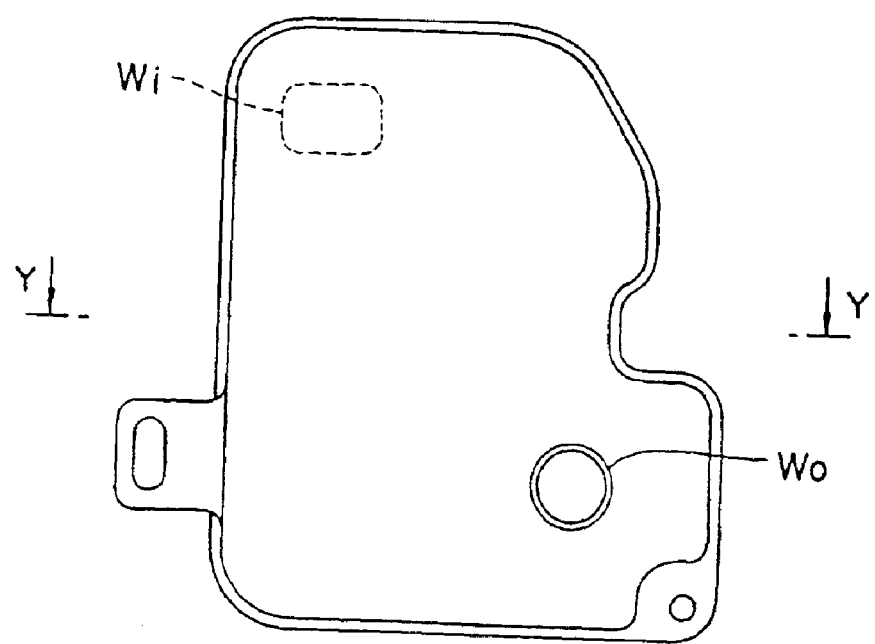
FIG. 29 is an explanatory view in top plan showing the oil strainer.
Figure 30:
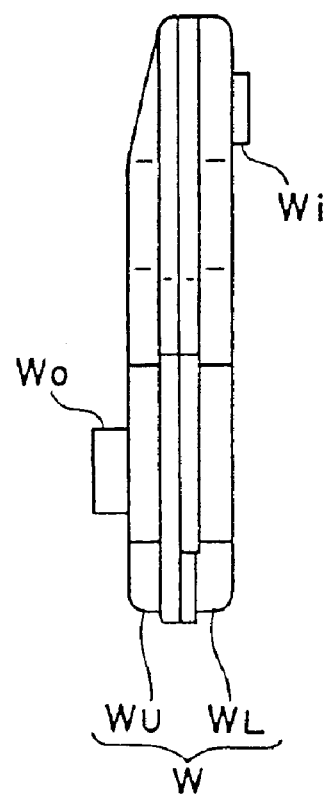
FIG. 30 is an explanatory view in side elevation showing the oil strainer.

In a portion extending along line O-M4 in FIG. 10, as FIG. 27 shows, dummy hole 40F on the die plate 33 side is mated with half body molding portion 20C on the rotor 13 side, but no molded product from second injection step is held on either side.

Figure 11:
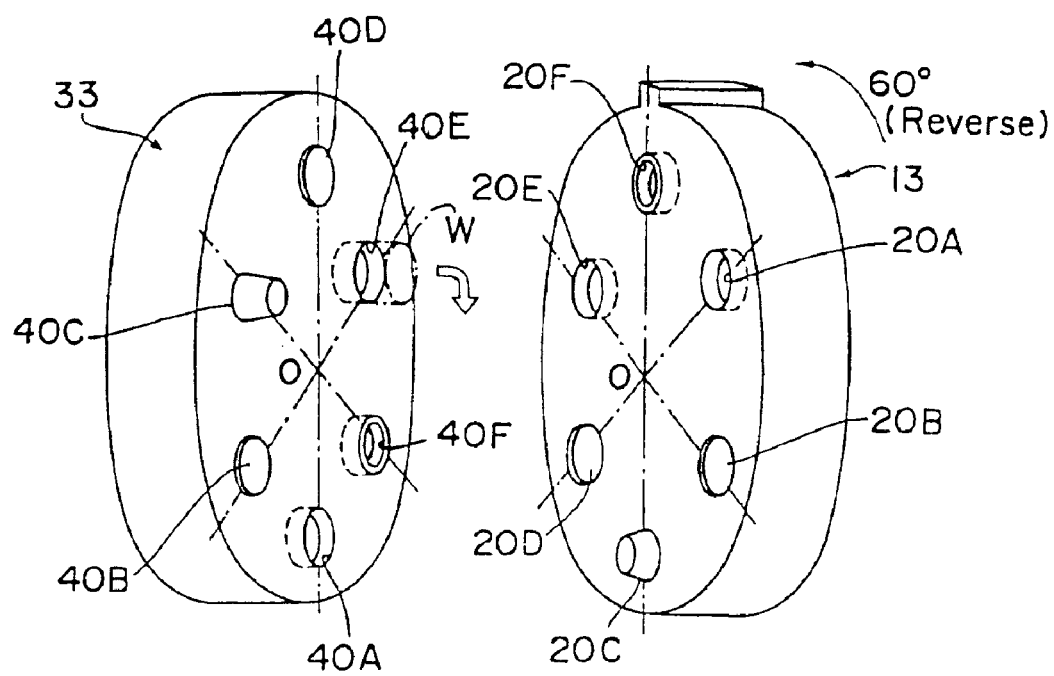
FIG. 11 is a perspective view schematically showing matching of molding portions and dummy holes at a 120° reverse turn position (initial position) of the rotor and die plate.

Subsequently, die opening is carried out again by causing the movable die 2 to retreat relative to stationary die 1, and as FIG. 11 shows, the rotor 13 is again reversed 60 degrees (120° reversal from 2nd turn position). Thus, rotor 13 returns to its initial position (see FIG. 7).

Therefore, combinations of molding portions of stationary dies 1 with molding portions of movable die 2, and of dummy holes are same as the combinations at initial positions shown in FIG. 7. In this case, rotational positions of changeover slots 22A–22E on the rotor 13 of stationary die 1 are same as the initial positions shown by double dash chain lines in FIG. 4.

Further, in this condition, the movable die 2 is brought into closure with the stationary die 1 and die clamping (first die clamping in the next cycle) is made, so that molding portions of the stationary die 1 and those of the movable die 2 are mated into combinations. Thus, molding cavities similar to those at initial positions shown in FIG. 7 and FIGS. 12 to 15 can be obtained.

In this clamped die condition (first die clamping in the next cycle), melted resin injection (first injection in the next cycle) from a molder (not shown) is carried out, whereby in molding cavities formed by combinations of molding portions of stationary die 1 and movable die 2 the following molded products are produced in the same way as in aforesaid first injection.

Half body molding portion 40A (female)/half body molding portion 20C (male): lower half body $W_L$ Intermediate element molding portion 40B/intermediate element molding portion 20B: filter Wf Half body molding portion 40C (male)/half body molding portion 20A (female): upper half body $W_U$ Half body molding portion 40E (female)/half body molding portion 20E (female): finished product W Then, die opening is carried out again by causing the movable die 2 to retreat relative to stationary die 1, and a finished product W obtained by the combination of half body molding portion 40E (female) on the die plate 33 side and half body molding portion 20E (female) on the rotor 13 side is taken out.

That is, one additional finished product W can be obtained by carrying out two reversal runs from the 120° turn position.

Thus, by repetitively carrying out the steps illustrated in FIGS. 7 to 11 (process of from initial position to return to initial position) it is possible to obtain one synthetic resin hollow member (oil strainer W) with an intermediate element (filter Wf) set between upper and lower half bodies $W_U$, $W_L$ for each two 60° turns of the molding die (rotor 13).

As described above, according to the present embodiment, one synthetic resin hollow member having a filter Wf set between upper and lower half bodies $W_U$, $W_L$ can be obtained for each two 60° turns. This makes it possible to carry out the steps of molding and butt-joining of half bodies $W_U$, $W_L$ and molding of filter Wf as a series of steps using the DRI method. Further, since the job of setting filter Wf in upper or lower half bodies $W_U$, $W_L$ is automatically performed in the dies 1, 2, such troublesome manual operations as may otherwise be required can be eliminated.

That is, as compared with the prior art in which adhesive and/or thermal fusion is used for joining half bodies, present invention provides for good improvement in production efficiency, with high bond strength and good sealing performance secured with respect to abutting portions of half bodies $W_U$, $W_L$ through utilization of the DRI method.

The foregoing embodiment relates to an oil strainer, but the present invention is not limited to use in such an application. The invention is effectively applicable to other kinds of synthetic resin structures having an intermediate element set between a pair of synthetic resin half bodies. In the present embodiment, n in (360/6n) degrees and (360/3n) degrees is 1 (n=1), but this n may be other integer or natural number. In this case, a larger number of molding portions are provided in one die assembly, it being thus possible to increase the number of finished products obtainable in each cycle.

Therefore, the present invention is not limited to above described embodiment. Obviously, various improvements, modifications, and design changes are possible without departing from the spirit and scope of the invention.

What is claimed is:

1. An apparatus for manufacturing a synthetic resin hollow member incorporating an intermediate element wherein after the intermediate element is disposed between a pair of synthetic resin-made half bodies, the half bodies are brought into abutment with each other and joined together at their abutting portions, whereby the synthetic resin hollow member incorporating the intermediate element is produced, the apparatus comprising:

a pair of molding dies assembled together so as to be opened and closed relative to each other;

rotary mechanism for rotating at least one of the molding dies over an angle of (360/6n) degrees for each turn relative to the other molding die wherein n is a natural number; and injection machine for injecting a melted resin mass into a molding cavity defined by the pair of molding dies being closed;

the molding dies each having a half body molding section consisting of at least one male molding portion and two female molding portions provided in a repetitive sequence of male/female/female in the direction of rotation for each rotational run over an angle of (360/3n) degrees, and an intermediate element molding portion provided between specified half body molding portions in the direction of rotational movement for each (360/3n) degrees; and wherein:

for every two rotational runs of the molding dies, a first injection is carried out such that first and second half bodies are molded by a combination of male and female molding portions, and an intermediate element to be set between the first and second half bodies is molded by a combination of intermediate element molding portions, and after the intermediate element is mated to and fitted in the first half body molded at the first injection step, the first half body in which the intermediate element is set is mated to and abutted with a corresponding second half body so that the half bodies are assembled into a molded product, and a second injection is carried out such that melted resin is injected onto the abutting portions of the two half bodies for joining the half bodies together, whereby for every two rotational runs of the molding dies, a hollow member with the intermediate element set between the first and second half bodies can be obtained.

* * * * *